(12) United States Patent
Cleveland

(10) Patent No.: US 6,859,206 B2
(45) Date of Patent: Feb. 22, 2005

(54) METHOD AND APPARATUS FOR PREPARING CUSTOMIZED READING MATERIAL

(76) Inventor: Dianna L. Cleveland, 22592 Le Dana, Mission Viejo, CA (US) 92691

( * ) Notice: Subject to any disclaimer, the term of this patent is extended or adjusted under 35 U.S.C. 154(b) by 177 days.

(21) Appl. No.: 10/309,630

(22) Filed: Dec. 4, 2002

(65) Prior Publication Data

US 2003/0097636 A1 May 22, 2003

Related U.S. Application Data

(63) Continuation of application No. 09/483,445, filed on Jan. 14, 2000, now Pat. No. 6,683,611.

(51) Int. Cl.$^7$ ............................................. G06T 11/00
(52) U.S. Cl. ...................... 345/471; 345/901; 434/178
(58) Field of Search ................................ 345/471, 901, 345/903; 434/178

(56) References Cited

U.S. PATENT DOCUMENTS

| | | |
|---|---|---|
| 3,575,501 A | 4/1971 | Rosenberg |
| 3,892,427 A | 7/1975 | Kraynak et al. |
| 4,985,697 A | 1/1991 | Boulton |
| 5,122,952 A | 6/1992 | Minkus |
| 5,161,978 A | 11/1992 | Kahn |
| 5,173,051 A | 12/1992 | May et al. |
| 5,213,461 A | 5/1993 | Kalisher |
| 5,387,107 A | 2/1995 | Gunter et al. |
| 5,465,213 A | 11/1995 | Ross |
| 5,779,486 A | 7/1998 | Ho et al. |
| 5,810,605 A | 9/1998 | Siefert |
| 5,835,922 A | 11/1998 | Shima et al. |
| 5,864,869 A | 1/1999 | Doak et al. |
| 5,875,110 A | 2/1999 | Jacobs |
| 5,890,911 A | 4/1999 | Griswold et al. |
| 5,893,132 A | 4/1999 | Huffman et al. |
| 5,893,717 A | 4/1999 | Kirsch et al. |
| 5,904,485 A | 5/1999 | Siefert |
| 5,907,837 A | 5/1999 | Ferrel et al. |
| 5,934,909 A | 8/1999 | Ho et al. |
| 5,951,298 A | 9/1999 | Werzberger |
| 5,957,693 A | 9/1999 | Panec |
| 5,967,793 A | 10/1999 | Ho et al. |

OTHER PUBLICATIONS

Anthes, G.H., "A New Page." *Computerworld*, vol. 31, No. 25, Jun. 23, 1997.

Alexander, G., "Custom Book Printing and Book Printing on Demand." *Seybold Report on Publishing Systems*, 1992.

(List continued on next page.)

*Primary Examiner*—Matthew Luu
(74) *Attorney, Agent, or Firm*—Stetina Brunda Garred & Brucker

(57) ABSTRACT

A presentation of textual material is provided in a "role-play" reading format which has text corresponding to the dialogue of a plurality of characters in order to facilitate reading aloud in a group. The text for the dialogue of a plurality of characters is presented in a different indicia throughout substantially all the presentation. Preferably the indicia is color so the dialogue for each character is in a different color. The test for each character is also selected and presented at a level corresponding to the reading level of the reader selecting or assigned to read each character. The text is preferably selected from among a plurality of texts pre-written at substantially different reading levels. The reading material can be presented on paper, or on media suitable for display on an electronic screen. The text for each character is in a size and font suitable for the reading level of the reader selecting or assigned to read the dialogue for the character. A legend on each page of the reading material correlates the identity of each reader with the character or characters selected or assigned to be read by each reader, and with the indicia applied to the dialogue for each character.

49 Claims, 15 Drawing Sheets

OTHER PUBLICATIONS

Friedman, J., "All the Text That's Fit to Print," *InformationWeek*, No. 364, Mar. 16, 1992.

Greenfield, E., "Evolution of the Textbook: From Print to Multimedia," *The Journal*, vol. 20, No. 10, May 1993.

Jeffrey, Noel., *Digital Printing*, published by Micro Publishing Press, Inc. First Print, Oct. 1996.

Lucke K., "Abstract of Customized Digital Books on Demand Issues in the Creation of a Flexible Document Format." *Visible Language*, vol. 32, No. 2, p 128–49.

Maling, A. & Houghton, K., "Speedy Postscript Printers Spur Publishing–On–Demand." *Mac Week*, 1993.

Okada, N. & Endo, T., "Story Generation Based on Dynamics of the Mind." *Computational Intelligence*, vol. 8, No. 1, 1992.

van Herwijnen, E., "Practical SGML." *European Laboratory for Particle Physics*, Geneva Switzerland Kluwer Academic Publishers/E335–0.

Waller, D.G., "Abstract of Problems in Publishing; and EDI Paradigm." *P&IM Review and APICS News*, vol. 11, No. 6, p. 26, Jun. 1991.

"Text Can Contain Many Books' Chapters," Original Notes. *The Journal*, vol. 19, No. 1, Jun. 1992.

"Using Framemaker, FrameMaker 4." *Windows and Macintosh*, part No. 41–03776–00, Sep. 1993.

*Fairy Tales for Two Readers*. Teacher Idea Press, 1995.

Personalized Children's Books; i.e. BooksForMe, KidCartoons; Advertisement in the New York Times, Thursday, Nov. 18, 1999.

FIG. 3

What kind of book would you like to read?

84 — 82

- ○ Newest Releases
- ○ Top 10 Bestsellers
- ○ Action
- ○ Adventure
- ○ Animals
- ○ Biography
- ○ Beach
- ○ Dinosaurs
- ○ Drama
- ○ Fantasy
- ○ History
- ○ Humor
- ○ Music
- ○ Mystery
- ○ Mythology
- ○ Scary
- ○ Science Fiction
- ○ Sports
- ○ Suspense
- ○ All

FIG. 5

Order Form

| Item # (140) | Description (142) | Qty. (144) | Price (146) | Subtotal (148) |
|---|---|---|---|---|
| ☐ | ☐ | ☐ | ☐ | ☐ |
| ☐ | ☐ | ☐ | ☐ | ☐ |
| ☐ | ☐ | ☐ | ☐ | ☐ |

Order total: ☐
Tax: ☐
Shipping: ☐
Total: ☐

Name: ☐
Address: ☐
City: ☐     State/Prov: ☐
Country: ☐     Zip/Post. code: ☐
Phone: ☐
E-mail: ☐

Method of Payment

○ Check     ○ Bill Me
○ Visa      ○ MasterCard     ○ American Express

Credit Card#: ☐
Exp. date: ☐

[Submit]     [Reset]

FIG. 10

| Tom | Jane | Mom | Dad | Mom |
|---|---|---|---|---|
| Tortoise | Hare | Race Master | Small Parts | Narrator |
| Green | Red | Blue | Brown | Black |

LEGEND 1

| Tom | Jane | Mom | Dad | Mom |
|---|---|---|---|---|
| Tortoise | Hare | Race Master | Small Parts | Narrator |
| Green | Red | Blue | Brown | Black |

LEGEND 2

| Beginning Reader | Intermediate Reader | Advanced Reader | Adult Reader | Adult Reader |
|---|---|---|---|---|
| Tortoise | Hare | Race Master | Small Parts | Narrator |
| Blue | Purple | Red | Brown | Black |

LEGEND 3 FOR BASIC BOOK

FIG. 12c

METHOD AND APPARATUS FOR PREPARING CUSTOMIZED READING MATERIAL

This application is a continuation of application Ser. No. 09/483,445 filed Jan. 14, 2000, now U.S. Pat. No. 6,683,611.

FIELD OF THE INVENTION

This invention involves a method of producing reading materials in which the portion of a story associated with each of a plurality of characters is printed or displayed in a different indicia, color or representation so that each reader in a group can read the parts of specific characters throughout the book and easily follow along. This invention also involves a method of producing reading materials in which the portion of a story associated with each of a plurality of characters is also written at a predetermined but selectable readability level and presented in an identifiable format throughout the reading material. It also involves the reading material resulting therefrom.

BACKGROUND OF THE INVENTION

While the development of television and video has enabled learning by audio-visual means, the basic method of learning and acquiring knowledge continues to be reading. Reading is a fundamental course in every school in every country and reading at home supports and complements reading at school.

There is a clear correlation to reading ability, literacy, and crime. About 60 percent of prison inmates are illiterate. There is also a clear correlation between literacy, education and poverty. Over 80 percent of prison inmates are school dropouts and about 60 percent of prison inmates were raised in poverty. The ability to read underlies core values and problems of our society. The desire to read underlies reading ability achievement. Yet despite the importance of reading, many people fail to develop sufficient reading ability to function in society. Reading is an acquired skill, that improves with practice. Although national averages indicate that most students know how to read, studies show that most don't enjoy reading enough to do it very often. It is a common known fact that human behavior is directly correlated with pleasure and displeasure. Therefore, those that do not enjoy reading are less likely to read often. Conversely, those that do associate reading with pleasure tend to read often. Further, there are many people that when they read, have shorter attention spans and become bored or tired easily after only a short duration and thus they tend to quit a story of any significant length in midstream. By not reading an entire story, these readers miss out on the full enjoyment and stimulation that reading provides and as a result, may not associate pleasure with reading but instead associate boredom, frustration or failure. Most stories that are found to be the most stimulating and enjoyable are usually stories of a significant or substantial length. These lower attention span readers reading alone, or even taking turns with another reader page by page or section by section, have to read either a substantial portion or all of the story themselves while providing their own visualization of the plot and all the characters. Again, these readers become bored or tired and as a result, many turn to television for presenting them with an interesting story that takes less effort. It is not time that these readers lack as most television programs are of significant length. It is the amount of effort, desire and pleasure association with reading that they lack. Thus, there is a need for (1) improving reading skills, (2) improved ways to encourage people to want to read more and (3) improved ways to lessen the boredom that can be associated with reading materials that are of significant or substantial length.

One important way to improve reading skills is to read aloud. Reading aloud not only develops and enhances reading ability, it develops verbal language skills and public presentation skills. A 1985 Commission organized by the National Academy of Education and the National Institute of Education, and sponsored by the U.S. Department of Education found that "the single most important activity for building the knowledge required for eventual success in reading is reading aloud to children." The Commission provides evidence that supports the use of reading aloud in school and at home and recommends that reading aloud to children is a practice that should continue throughout the grades. Research has shown that listening comprehension comes before reading comprehension. Children can hear and comprehend reading material that is more complicated than what they can actually read. Listening to reading enhances comprehension and vocabulary. Research has shown that a child's reading level does not catch up to his or her listening level until approximately the eighth grade. Thus, there is a need for improved ways to encourage people to read aloud together.

The current practice of reading aloud usually involves a parent reading aloud to a child or a child reading aloud to a parent while they share one copy of book or reading material. Unfortunately, most books are written at a single reading level. Therefore, when the child reads aloud to the parent, it is necessary to select a book that has been written at a readability level suitable for the child. When the parent reads aloud to the child, the book selected can be at a higher readability level and thus more interesting and challenging to listen to, however, the child can not usually read many portions of this book aloud. Thus, a parent and child cannot readily read a book aloud together. Further, should more than one parent or child wish to be involved in the reading experience, there is further difficulty leaving usually only one reader and the remaining as listeners. When books are read in groups, those readers with advanced reading skills become bored, while those with lower reading skills have difficulty reading text that is above their actual reading ability which can cause embarrassment. They can also loose track of where they are reading causing further embarrassment and frustration. This type of group reading can discourage lower level readers from improving and wanting to read in general. Thus, there is a need for an improved way to read in groups and to encourage participation by all readers that is comfortable, challenging and stimulating to all the readers in a group in order to improve reading skills and provide an enjoyable reading experience.

Panec, U.S. Pat. No. 5,957,693, proposes an apparatus for shared reading that attempts to solve this problem for a skilled reader and a novice reader by providing a book with a story developed through two alternating and interwoven texts, one written at a higher skill level for a skilled reader, the other written at a lower skill level for a child or novice reader to read. However, the Panec method with two different level readers, as well as typical shared reading methods among two readers with comparable reading levels, involves the readers simply alternating by page or section in reading aloud while sharing the same book. Although the Panec method attempts to solve the problem of disparity in reading levels for one novice reader and one skilled or adult reader, it does not encourage or provide an organized method or means to get more than two readers within a typical family or group involved in reading together. It also only provides a "predetermined" readability level and not a "selectable" reading level.

When there is more than one child in a given household, the parent or parents must find time to read, usually a different book, to or with each additional child as there exists a lack of books that can hold the attentions or interest of, or be read without difficulty by children of varying ages. Reading a book prepared with the Panec method with topic, content and readability levels suitable for a novice reader and a skilled reader would have to be read with the first child and a second book with topic, content and readability levels suitable for the second child and a skilled reader would have to be read and so on. Thus, a problem still exists for parents and teachers in providing the benefits of reading aloud in a group. There is clearly a need to present reading material that accommodates a span of novice to intermediate to skilled level readers within the same story or reading material along with a method for organizing the reading material for encouraging and enhancing the enjoyment of reading aloud in a group.

One way to encourage people to read more is to make it more pleasurable and fun, and one way to reduce the boredom associated with reading text of substantial length is to split up the story among a group of readers. This is typically done by altering the reading of text by section, page or chapter.

It is thus an objective of this invention to improve reading skills by facilitating the practice of reading aloud, and the benefits derived therefrom, by providing an organized group reading format that encourages people to read more by enhancing the pleasure and enjoyment of reading by providing a group "role-play" reading format, and that increases the likelihood of a reader staying involved in an entire story by using the aforementioned group "role-play" reading format. It is a further object of this invention to facilitate and enhance the aforementioned method of "role-play" group reading by providing a multiple of reading materials that are organized, structured, customized, formatted and displayed in a manner that makes it easier for each reader to identify and follow the parts they are to read. It is a further object of this invention to provide improved reading materials that make it easier and also more enjoyable for all readers to develop and improve reading skills by providing text suited to the reading ability level of a plurality of readers for the portions of text associated with the character or characters each reader selects or is assigned to read within a role-play reading format that does not disrupt the overall presentation of text of story.

SUMMARY OF THE INVENTION

A method is provided for producing reading material that makes reading more enjoyable and that helps to improve reading skills for a plurality of readers. A method is also provided for writing, constructing, re-constructing, formatting and printing or displaying reading materials in a manner that facilitates the reading of a book by several readers aloud in a family or group setting. The method also provides an enhanced reading experience for families, classrooms and groups within a classroom by providing readers with and opportunity for "role-play" reading which is facilitated by each reader selecting one or more characters in a story and reading those parts while assuming the "persona" of that character, similar to acting in a play. This method also serves to split up the amount of material to be read by each reader thereby reducing the potential of readers become bored with reading because of reading a substantial portion of text.

The method provides a way to facilitate "role-playing" wherein the dialogue for each of the story's characters is viewed or printed in a different representation or indicia throughout the dialogue so that each reader in a group can read the parts of specific characters throughout the book and easily identify and follow along while reading their own printed copy of the book or while reading a shared version of the book displayed on a screen that is visible to all the readers in the group.

Moreover, one of the nation's favorite past times is watching or hearing stories unfold as evidenced by the popularity of television programs and movies. Role-play reading together as a family in a safe and supportive environment helps to build or strengthen social/emotional bonds between members of the family or a group along with helping to build confidence and self-esteem in children. Role-play reading can also be a lot of fun thus increasing the enjoyment and pleasure of reading and thus encouraging people to read more often.

When children of any age have opportunities for presentation in front of group, in this case, their own family in a non-intimidating atmosphere, they gain experience and confidence to present themselves in front of other more potentially intimidating atmospheres such as peer groups and classrooms.

Each active participant in a group of family readers is presenting a "reading role model" for the children. Children are more apt to read if they come from a family of readers. With role-play reading, children learn variety of expressions and inflection with respect to reading text. Further, children are more apt to become lifetime readers if they learn to love reading as a result of it being enjoyable. This method of "role-play" reading also helps and encourages a lower attention span reader to stay involved throughout the entire story without the need to read the entire story themselves. The extra stimulation that is provided from all readers assuming a persona of a character in a book and reading the parts aloud while demonstrating expression of the persona helps to make a story more interesting to the lower attention span reader, thus reducing potential boredom.

A method is also provided for writing, constructing, re-constructing, re-formatting and printing or displaying reading materials wherein the dialogue for each of the story's characters is also written at a readability level that matches that of the reader who has selected or been assigned to read that particular character's dialogue so that each member of a group can read a selected character's dialogue with confidence and without difficulty throughout the entire book. A method is also provided for recommending a reader to select a particular character that is best suited for the reading ability of the reader. A method is also provided for producing "customized" reading materials wherein any particular group of readers can each select a desired character or characters to "role-play" read and associate a desired indicia and reading ability level so that the text to be written and presented for that selected character or characters is presented in the desired indicia that is correlated to each reader.

The resulting textual material has the text for the dialogue for each of a plurality of characters in the story presented in a different indicia throughout substantially all the presentation. Preferably, the indicia is color so that the dialogue text for each character is presented in a different color. The text for each character is selected and presented at a level corresponding to the reading level of the reader selecting or assigned to read each character. The reading material can be presented on paper, or on media suitable for display on an electronic screen, or it can be transmitted directly to a computer for display on a computer monitor or other viewable screen such as a television. The text for each character is in a size or font style that is suitable for the reading level of the reader selecting or assigned to read the character. For example, for a very young or early reader, a font would be used that presents letters of the alphabet in the same manner and style that young children learn at school. For example, the letters "a", "e" and "g" presented in most type fonts are not consistent with the style of letter children are taught in school. Thus, the letters could appear in a Futura or Avante Guard font which produces these letters "a", "e" and "g" in a style the children are used to seeing in their texts at school. The resulting reading material is preferably, but not necessarily, further produced with a legend printed or displayed on each page which correlates the identity of each reader with the character or characters selected or assigned to be read. The legend also correlates the indicia assigned to each selected or assigned character with each reader.

There is also advantageously provided a method and apparatus for preparing such reading material, material having a plurality of characters with dialogue to be read aloud by a plurality of readers. The apparatus includes means for inputting several versions of text for each sentence of dialogue for one or more characters in a story to an information processor, each version of text having been re-written with words and sentence structure suitable for each of a plurality of reading ability levels. The apparatus also includes means for inputting information relating to the reading ability levels of a plurality of readers to the information processor. The apparatus also includes means for retrieving a specific version of the re-written text for each sentence of dialogue for one or more characters in a story that matches the reading ability level of one or more of the plurality of readers previously entered into the information processor, the retrieved version of text being prepared and formatted for presentation in the resulting reading material. There are further provided means for recommending a reader select a particular character wherein the written or re-written text is the best suited text for the reader's reading ability. Moreover, the apparatus advantageously includes means for applying indicia to the text for at least one of the characters to distinguish the text from the text assigned to other characters. Preferably the indicia is color. Further, the reading material is advantageously provided on a plurality of pages, and further includes means for providing a legend on a plurality of the pages correlating the character, reader and the indicia.

The invention also includes a method for preparing reading material having a plurality of characters with dialogue to be read aloud by a plurality of readers. The method includes the steps of inputting information relating to reading ability levels of a plurality of readers to an information processor and selecting text for a plurality of characters appropriate for the reading ability level of the particular reader assigned to each character. The reading material is then presented for viewing and reading aloud by the assigned readers for all the dialogue to be read by the first and second readers, and so on for any and all readers. Preferably the method includes the further step of providing indicia to the text for at least one of the characters to distinguish the text from the text assigned to other characters. Advantageously the indicia is achieved by applying a color to the text for at least one of the characters to distinguish the text from the text assigned to other characters. Further, the method preferably includes presenting the material on a plurality of pages, and further providing a legend on a plurality of the pages correlating the character, reader and indicia. The step of presenting the reading material can comprise the step of printing the material on paper or tangible media, or displaying the reading material on a visible display controlled by a computer processor.

There is thus advantageously provided a means of customizing reading material to a "role-play" reading format by distinctively identifying text to make it easier for each reader to find and follow the text associated with each reader's selected or assigned character or characters and by structuring the material to suit the reading ability levels of each of a plurality of readers.

There is thus advantageously provided materials that make group reading easier and more enjoyable for a plurality of readers in order to encourage the development of reading skills. There is also provided indicia associated with a character and then text presented in that indicia that makes it easier for each reader to follow the parts they are to read aloud. There is further provided text suited to the reading ability level of a plurality of readers that makes it easier for lower level readers to read with confidence and without difficulty and that makes it more stimulating for higher level readers in the same group. The present invention helps to recapture opportunities that are typically lost for lower level readers to learn from peers who read at higher levels by avoiding the need to segregate children by reading ability when in group settings such as classrooms. This problem of having to segregate children can lead to other problems, including social segregation, misplaced impressions of inferiority or superiority, and a dislike of reading by poor readers. Thus, the present invention helps to eliminate the need to segregate readers by reading ability in order to improve reading skills. There is further provided improved reading materials that make it easier for readers in a group to develop reading skills. These, and other objects and advantages of this invention will become better understood when the following figures are considered along with the detailed description of the illustrative embodiments of this invention.

BRIEF DESCRIPTION OF THE DRAWINGS

FIG. 3 is an illustration of an information input screen;

FIG. 5 is an illustration of a display screen for selecting various subject matter for reading;

FIG. 10 is an illustration of a display screen showing an order form;

FIGS. 12A–12C are an illustration of a legend in exemplary reading material correlating character, reader and the indicia distinguishing the character's reading parts.

DETAILED DESCRIPTION OF THE PREFERRED EMBODIMENT

Figure 1A:
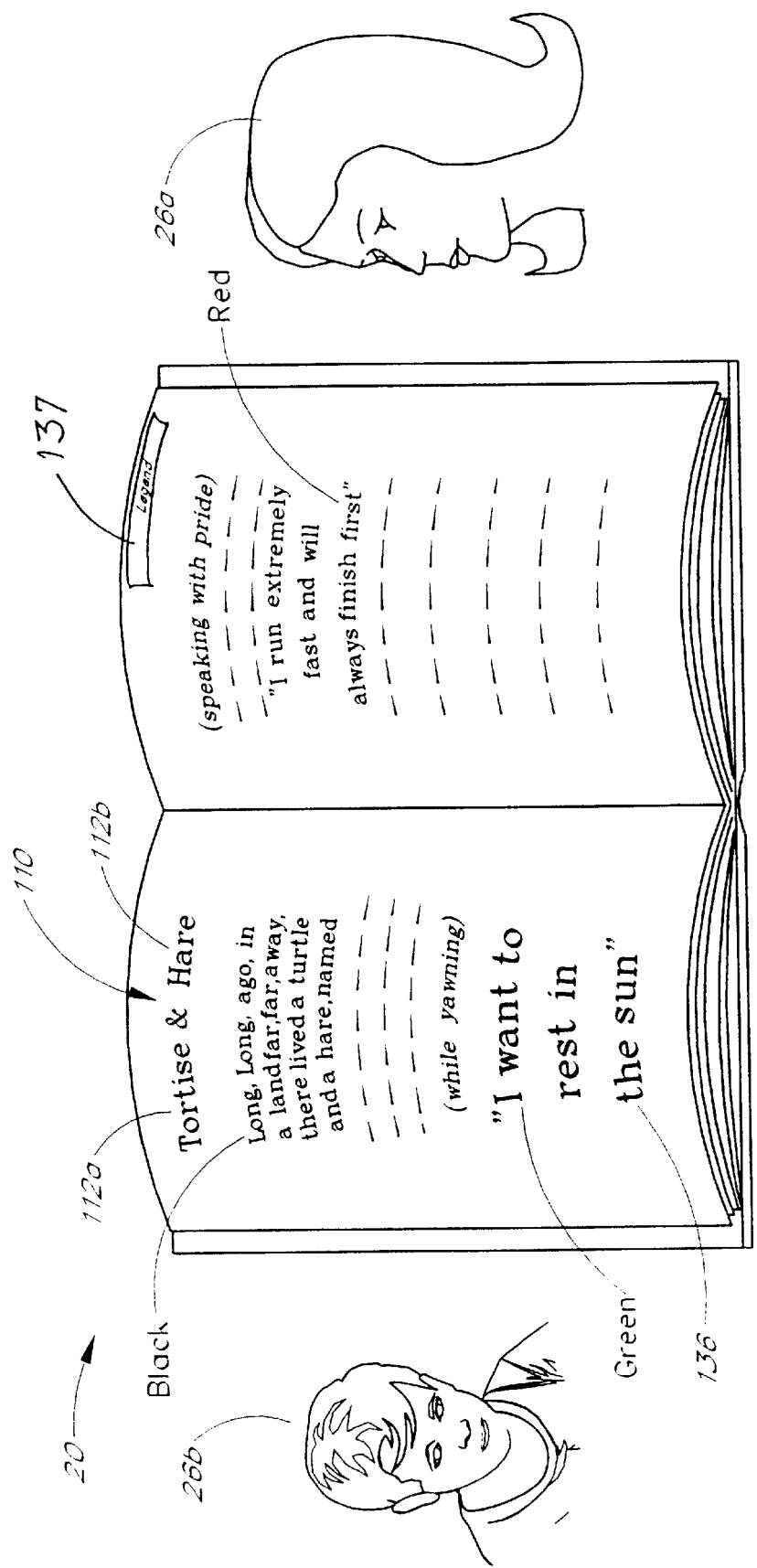
FIG. 1A is a perspective view of written materials implementing the present invention.

The reading material of this invention advantageously comprises material that is produced and presented in a "role-play" reading format so that a plurality of readers can select a character in the story that they will enjoy reading aloud and to produce the material in a format that is easy for the reader to read the role. The reading material is printed or displayed with specific text presented in an indicia, such as the color of the print, that identifies or sets off dialogue text for each of a plurality characters from other text to make it easier for a plurality of readers to identify and track the text they select or are designated to read without disrupting the overall presentation of text throughout a story.

A further method is provided for producing "customized" reading material comprising means for a specific group of readers to select specific characters to role-play read and further allowing readers to select a specific indicia to present the text in for each character selected. Thus, referring to FIG. 1A, the printed or displayed reading material preferably includes a visible indicia 136 that text is presented in that is associated with each reader 26 and that is used to identify the dialogue text for the reader's selected character 112. This can be achieved by associating a color with each reader 26 and with one particular and selected character 112 in the reading material and presenting that character's dialogue text in that indicia. Preferably the indicia 136 is color, so the text for each character is visibly different from the text for other characters. Preferably, a legend 137 is provided showing the name of the character displayed in the color corresponding to the character and to the reader. For example, a reader 26 Tom may select Tortoise as a character 112, and further select the color green, as reflected in FIGS. 1 and 9. Various indicia 136 can be used, including font sizes or styles or colors, print density, or graphic symbols before and after the text, or borders surrounding the text. The indicia 136 could also be in Braille to enable visually impaired or blind persons to read the text by tactile senses. But preferably the indicia 136 comprises a unique color that the text for each character throughout the reading material 110 is presented in and associated with. Further, the legend 137 could also include a picture of the story character 112 adjacent to the name of the character being displayed in the selected color.

The result of using color as indicia 136 is that the dialogue of each character 26 in the reading material 20 produced is printed or displayed in a different color or combination of color and indicia to differentiate each character in a story or book. When there are the same number of characters 112 in the story 110 as the number of readers 26 (and this number is relatively small, say 3–5 readers), each character's dialogue can be in a different color or indicia 136 which also designates a reader's color or indicia. For example, for three (3) readers, Tom, Jane and Mom, the text for the character, Tortoise is green and Tom's reader color is also green throughout the reading material, the text for the character, Hare, is Red and Jane's reader color is Red throughout the reading material, and the text for the character, Race Master is Blue and Mom's reader color is Blue throughout the reading material.

However, when there are a few more characters 112 in the story than there are readers 26, a different color indicia 136 would be used for each character and each reader would be associated with one or more of the colors and characters throughout the reading material. For example, if Tom and Mom were the only readers and Tom chose to read the parts of both the Tortoise and the Hare, then the parts that Tom is to read for the Tortoise dialogue are in Green, the parts for the Hare character are in Red, and the parts that Mom is to read for the Race Master are in Blue. Tom then identifies that his parts to read are in both Green and Red, yet Tom knows to read the Green parts as if he were the Tortoise and the Red parts as if he was the Hare. The narration is typically presented in black and is read by one or more of the readers.

When there are several more characters 112 in the story 110 than there are readers 26, another method can be used wherein the characters 112 selected by each reader 26 are all in the same color or indicia 136, but supplemental indicia are added to each color when indicating a reader's additional parts. For example, a readers main character would be in Red, his second character would be in Red but also contain a single underline and his third character would be in Red but also include a double underline. Alternatively, each additional character 112 per reader 26 could be shown in a different shade of color that is based from the reader's main color, for example: dark Red would be the color of the Reader's second character, and Orange could be the third.

When there are numerous characters 112 in the story 110, more than there are separate and distinct viewable or printable colors, the above methods may not be feasible. Therefore, to accomplish to the same task, the reader designations could change throughout the book. For example, if a main character 112 in the story 110 appears in the first half of the book but then not in the second half, that character's color or indicia 136 would change and be used to show a new main character's color that appears later in the book. This also helps to keep each reader 26 with enough parts to read throughout the reading material 20 if one of the characters 112 they have chosen does not stay as a main character throughout the reading material. For this method of changing colors and character designations throughout the story, the Legend provided becomes a very useful element so that readers can easily identify which text to read and which character they are reading. The goal is to keep a balance for each reader throughout the reading material.

By applying a different color or indicia to the text to be read by each reader or by applying a color or indicia to each of the character's text and then associating one or more colors with a particular reader, reading in a group is substantially enhanced. Further, printing several copies of the customized reading material, one for each reader so that sharing a book is not necessary, or displaying the customized reading material on a screen that can be viewed from a distance by all the readers in the group, makes it convenient for several readers to take turns reading a book as a group, or other reading material as a group, while enhancing the reading experience. By selecting one or more particular characters to read, a reader has the opportunity to "role-play" his character's part and persona while reading in a group. This also enhances the reading and listening enjoyment for all the readers.

In a more advanced embodiment of the present invention, the reading material is written, constructed, re-constructed, or formatted and printed or displayed in a manner that further aids each reader in reading the material with confidence and without difficulty by providing text for a plurality of readers that has been pre-written at a plurality of readability levels so that each reader can select a part that matches the reader's ability. The text is preferably pre-written at reading levels that are at least one grade apart, and more preferably at reading levels two or more grades apart. As used here, one grade refers to one grade in school.

In a more advanced embodiment of the present invention previously mentioned that comprises means to "customize" the reading material for a specific group of readers, the customized reading material is written, constructed, re-constructed, or formatted and printed or displayed with the dialogue text for the reader's selected character or characters pre-written at a readability level that matches the specific reader.

A more detailed explanation follows and includes a number of enhancements and options for the above process and the resulting reading material 20.

Figure 1B:
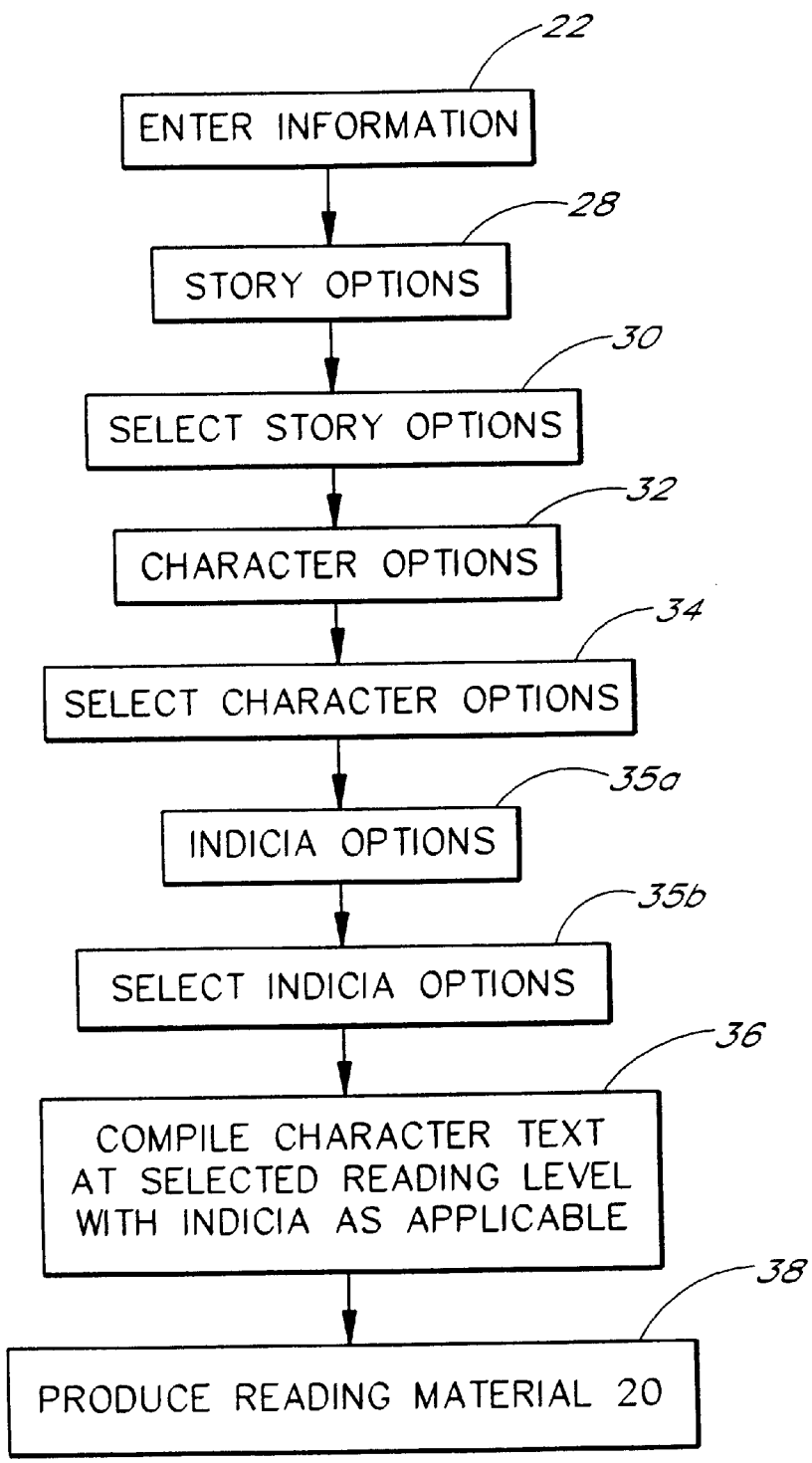
FIG. 1B is a diagram showing the preparation of the written materials of FIG. 1A.
Figure 2:
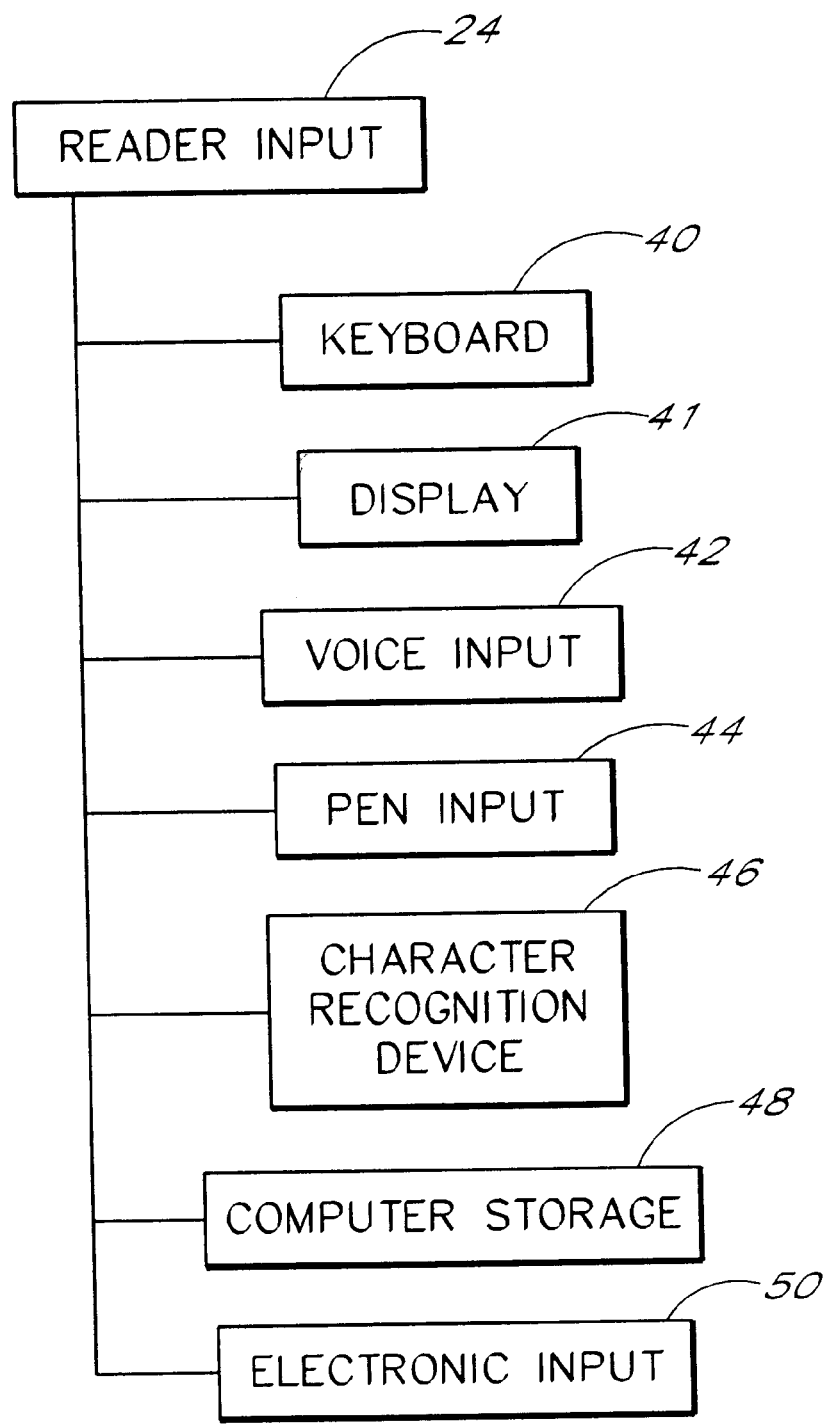
FIG. 2 is a diagram showing various input devices.

An overview of the process for producing "customized" reading material 20 for a plurality of readers to be read aloud as a group is shown in FIGS. 1A, 1B and 2. The reading material 20 comprises indicia and text presented in indicia that is viewable for reading, and may include short stories, long stories, series of stories, books, magazines, technical articles, or written text on any topic. Illustrations can be included in the reading material 20 as desired.

The process for producing the customized reading material 20 comprises providing specific information about each of the readers that will be reading the reading material as a group. In step 22, information about each reader is provided by the entering of the information into an information processor, such as a computer 24. The information for each reader preferably comprises information related to one or more of the following: the name of the reader; the gender of the reader; the age of the reader 26, the reader's grade in school; and the reading ability level of the reader. The process also comprises the selection by the readers of specific information from choices provided regarding the reading material to be produced. The selected information preferably comprises information related to one or more of the following: the type or topic of story to be read, the number of characters 112 in the story 110 that are to be read, the specific story to be read, a specific character in the selected story to associate with a specific reader in the group, and a color or indicia 136 to present the text in for each reader and/or selected story character.

In the simplest embodiment of the present invention, the customized reading material is produced based on one or more of the information provided in Step 22.

For illustration, three persons, or readers 26a, 26b and 26c will be used, say a mother 26a and her six-year-old son 26b named Tom, and her eight-year-old daughter 26c named Jane. Assume that the readers 26 request a story 110 involving three characters 112 and a narrator, and involving animals. In step 28 the information processor 24 selects and presents a list of several stories to choose from that contain an appropriate story line and content for the reader group based on the information provided in step 22. In the next step 30, the readers 26 select a story from this list after reviewing the information provided about the story in the list, say a fable about a Tortoise and a Hare. In step 32, for the story selected, a list and description of the characters involved in the story are presented along with the part of the narrator so that in step 34, each reader can select one or more character's dialogue for which they wish to read in the customized reading material 20. For example, the first child 26b (Tom) selects the Tortoise as his character, the second child 26c (Jane) selects the Hare as her character and the mother 26a selects the part of the Race Master and the narrator.

The information processor 24 has access to information that contains the story about the Tortoise and Hare along with the dialogue text for each story character pre-written in a variety of selectable readability levels. In Step 35a the user(s) are presented with various indicia 136 that can be used to present the text of each character in order to distinguish the text from adjacent reading material. In Step 35b the user(s) selects the indicia 136 for which the text will be presented in for each character in order to distinguish the text from adjacent reading material. In step 36 the information processor 24 uses information from step 22 and possibly other criteria to select the appropriate pre-written dialogue text for each story character by matching one of the plurality of readability levels of pre-written text stored in the information processor with the readability level of the reader who selected that character. In step 38, the customized printed material 20 is produced with the text for each character in the story written or displayed in a readability level appropriate for each reader. Ideally, but not typically, the narrator's text or narration could also be written or displayed in a readability level appropriate for a selected reader. The part of the Tortoise is produced at a readability level appropriate for the son 26b (Tom). The part of the Hare is produced at a readability level appropriate for the daughter 26c (Jane). The part of the Race Master and the narrator is produced at an adult readability level for the mother 26a.

Advantageously, in step 38, the text for each character can be coordinated with a font size or style suited for the reading ability of the reader. For example, the character's text to be read by the son 26b could be larger than normal so it is easier for the six-year-old son to read. The color could be a darker color so that it is easier to see and thus easier to read on the display or printed material. Advantageously, in step 38 the text for each character is also coordinated with and presented in a color or indicia that is preferably but not necessarily selected by the reader in steps 35a, 35b. Thus, for example, the son's portion of the text 20 for the Hare may be displayed or printed in very large red letters, while the daughter's portion of the text 20 for the Tortoise may be displayed or printed in smaller green letters, and the mother's (narrator and Race Master) text may be displayed or printed in black letters. In this manner, the simplest embodiment of the invention is combined with this more advanced embodiment, thus allowing the mother 26a, son 26b and daughter 26c, cooperatively, to read a story that is customized for the ability of each reader, with font size and color being used to help each reader keep track of the text to be read by each reader.

To produce the customized reading material for either the simplest and advanced embodiment of the present invention, the information processor 24 has to receive information on each of the readers 26 along with selection information from the readers. Referring to FIG. 2, this information may be input through a variety of means now known or developed in the future, including a keyboard 40, voice input device 42, pen input device 44, character reader 46, or computer database 48 whether it be remote, internal, or portable (e.g., disk or tape), or by electronic or optical data transfer 50, including wire, wireless, digital and optical data transfer. There are a variety of ways to input information into the processor 24, and the present disclosure is not intended to limit the ways that can be used.

There are also a number of options on the type of information to be input in step 22, and the timing at which the information is input. The information to be input preferably relates to producing the customized reading material 20, but need not be so limited that other information that has primary application to other uses may not be inputted. For example input information could include information to track reading development of one or more of the readers 26 or information useful for enhancing marketing of the reading material 20. There is a variety of information that can be used to generate a variety of customized reading materials 20, and this description is not intended to be limiting as to the specific information used in the illustrations and listed in this disclosure.

For illustration purposes, the information input at step 22 could include the reader's age, from which a readability level may be assumed and assigned by the information processor 24 using known data correlating age with readability level. Alternatively, the information input at step 22 could include a specification of the reader's grade in school, from which the information processor 24 assigns an appropriate readability level using known data correlating grade level with anticipated readability level. Moreover, the reader may designate a desired readability level, or take a short test presented by the information processor 24 or a test inputted into the processor 24 in order to rate the reader's readability level. There are a variety of short reading tests available, and the processor 24 could be equipped to present an appropriate readability level test in printed or display format for use by the reader 26. Alternatively, the processor 24 could be equipped to receive test input data from a variety of sources and evaluate the reader's readability level.

The timing at which the information can be input can also vary. For example, the color or other indicia 136 to be associated with each character 112 in steps 35a, 35b, could be selected at the time the characters 112 are selected, perhaps so the color would reflect some association that the reader has with the character, like green for green turtles in the above illustration. Alternatively, a reader's favorite color or colors could be input at the beginning step 22, with the color for the reader's character 112 or characters assigned by the information processor 24. There are a variety of times at which the information can be entered, and this description is not intended to be limiting as to a specific sequence.

Figure 3:
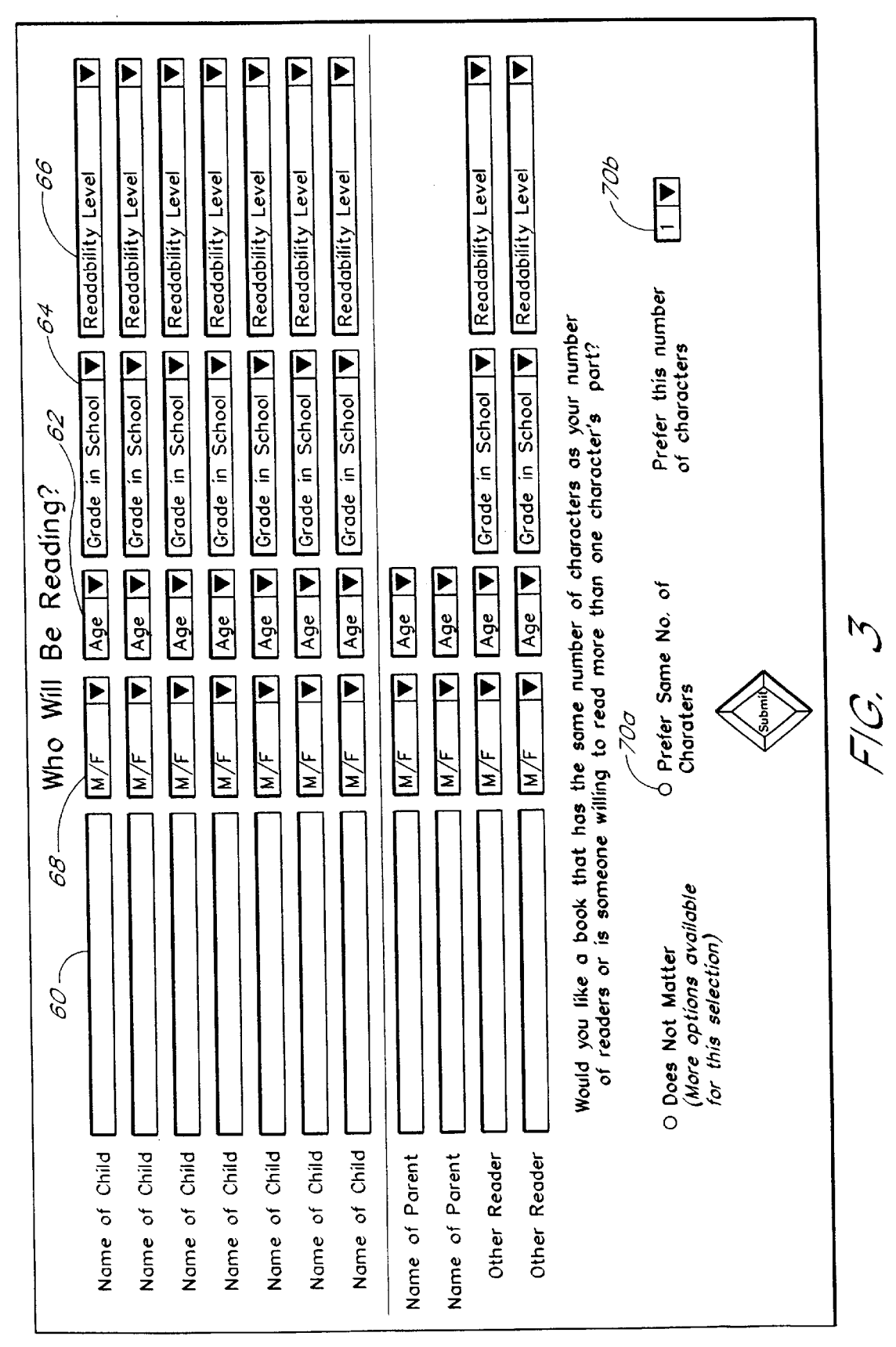

FIG. 3 shows an example of information to be input for a plurality of readers 26 through a keyboard 40 associated with a display 41 of a computer terminal or other display device in communication with the information processor 24. Preferably the data is input through the internet, or through a data communication link with the processor 24. The processor 24 may be remotely located, or it may comprise a computer program operating on a computer owned or controlled by one of the readers 26. Data entry areas 60 are provided for the names of each reader 26. Data entry areas 62 are provided for the age of each reader 26, and need not necessarily be entered for each reader 26. Data entry areas 64 are provided for each reader 26 grade in school and need not necessarily be entered for each reader 26. Data entry areas 66 allow direct entry of the readability level of each reader 26. The gender of each reader may be input in data entry area 68. Once input, this information is advantageously transmitted to the information processor 24 which uses the information to eventually provide text of an appropriate level to the reader for whom data is provided.

Figure 4:
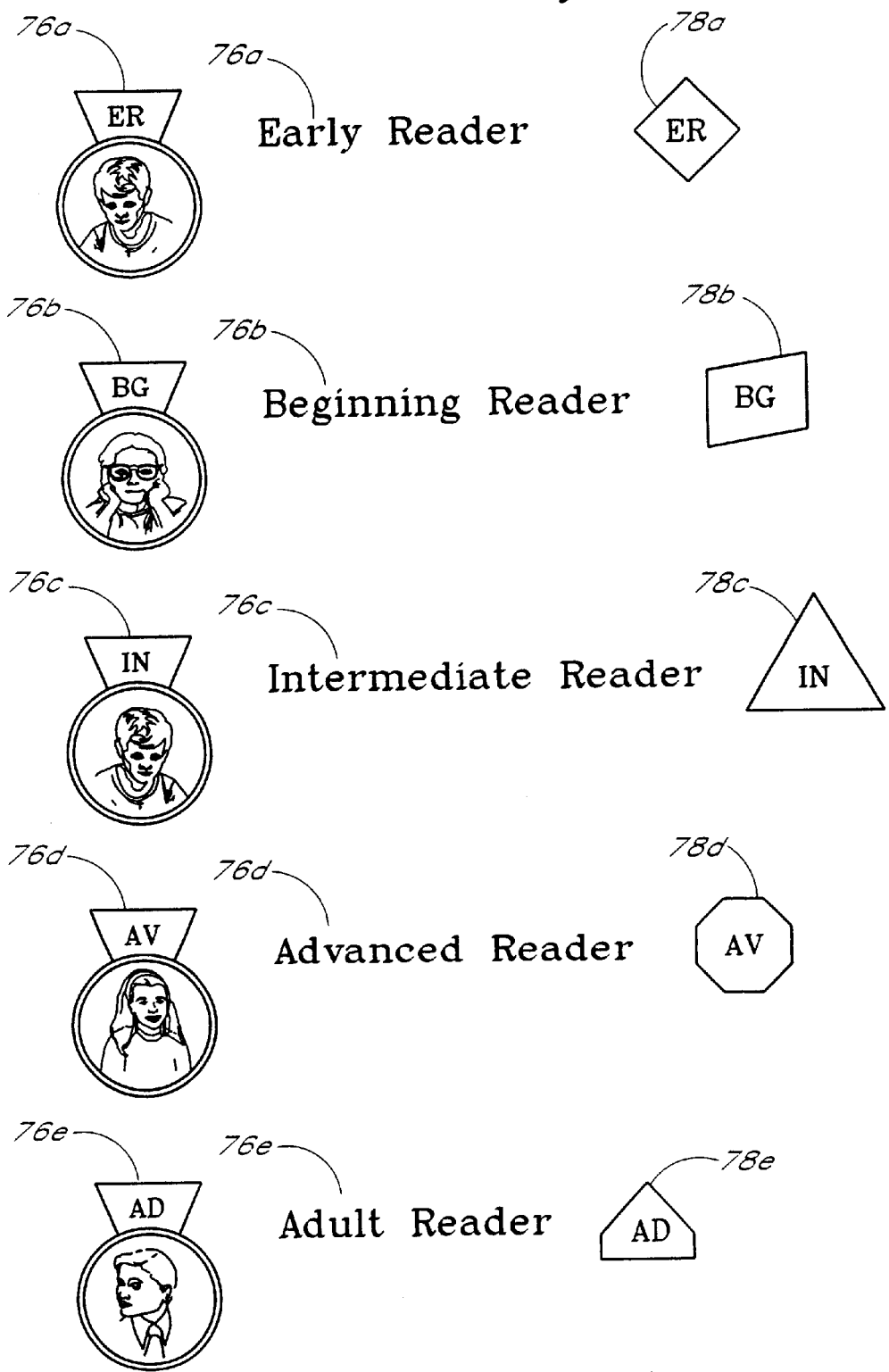
FIG. 4 is an illustration of indicia associated with reading levels.

It is possible to have separate pull-down menus associated with the data input areas for each reader 26 to help select the readability level and other information. Illustrative readability levels could include Early Reader (pre-school through kindergarten); Beginning Reader (grades 1–3); Intermediate Reader (grades 4–6); Advanced Reader (teenagers); and Adult (high school reading competency). FIG. 4 shows an illustrative display screen showing various readability levels 76 each associated with an indicator 78. By selecting the appropriate readability level 76, a reader 26 can input the desired readability level. The selection of the readability level 76 is transmitted to the information processor 24. The number and type of readability levels 76 can vary, as can the indicator 78 associated with each readability level.

Preferably, as also shown in FIG. 3, there are one or more information input areas 70a, 70b which relate to the number of characters 112 in the story 110 and to the number of readers 26 per character. Ideally, but not typically, the number of readers 26 matches the number of characters 112. However, this can limit the number of stories 110 available for various readability levels. For this reason, and for a variety of other reasons, one or more readers may need to, be willing to, or want to, read text for more than one character 112. Once entered by the readers, all information 70 is input to the information processor 24, preferably by hitting the enter button of a computer or by clicking on the "submit" button 72 on the display 41 associated with the information processor 24 as depicted in FIG. 3. The information on the number of characters can be presented in a separate data entry screen or area, or it can be combined with the information input for each reader as shown in FIG. 3. Other variations are also possible.

The next series of information input areas as shown in Step 28 preferably provide information to the processor 24 relating to the kind, type or subject matter of the story 110 or text desired by the readers as depicted in FIG. 1. FIG. 5 shows an exemplary screen associated with a display 41 (FIG. 2) on a terminal associated with the information processor 24. A variety of areas can be offered. FIG. 5 illustrates such areas 82 as new releases, best sellers, action, adventure, animals, art, biography, drama, fantasy, history, humor, music, mystery, mythology, non-fiction, scary/horror, science fiction, sports, and suspense. The specific areas 82 can vary. For example romance, news or science could be offered. Subcategories (not shown) can be offered within each area. For example, science could include subcategories of biology, mathematics, engineering, or aeronautics. Biography could include subcategories of explorers, politicians or scientists. News could include subcategories of local, national, or international dialogue news and could be written to provide news-reporter characters 112 who read or report the news at various reading levels, with narrators providing any detailed background useful to ensure an understanding of the reported news stories. Additional breakdowns within each sub-category could be offered. But there is advantageously provided a means for specifying a type of subject matter to be selected for the reading material 20. In the illustration of FIG. 5, the various subject matter areas 82 are associated with a selection area 84

Figure 6:
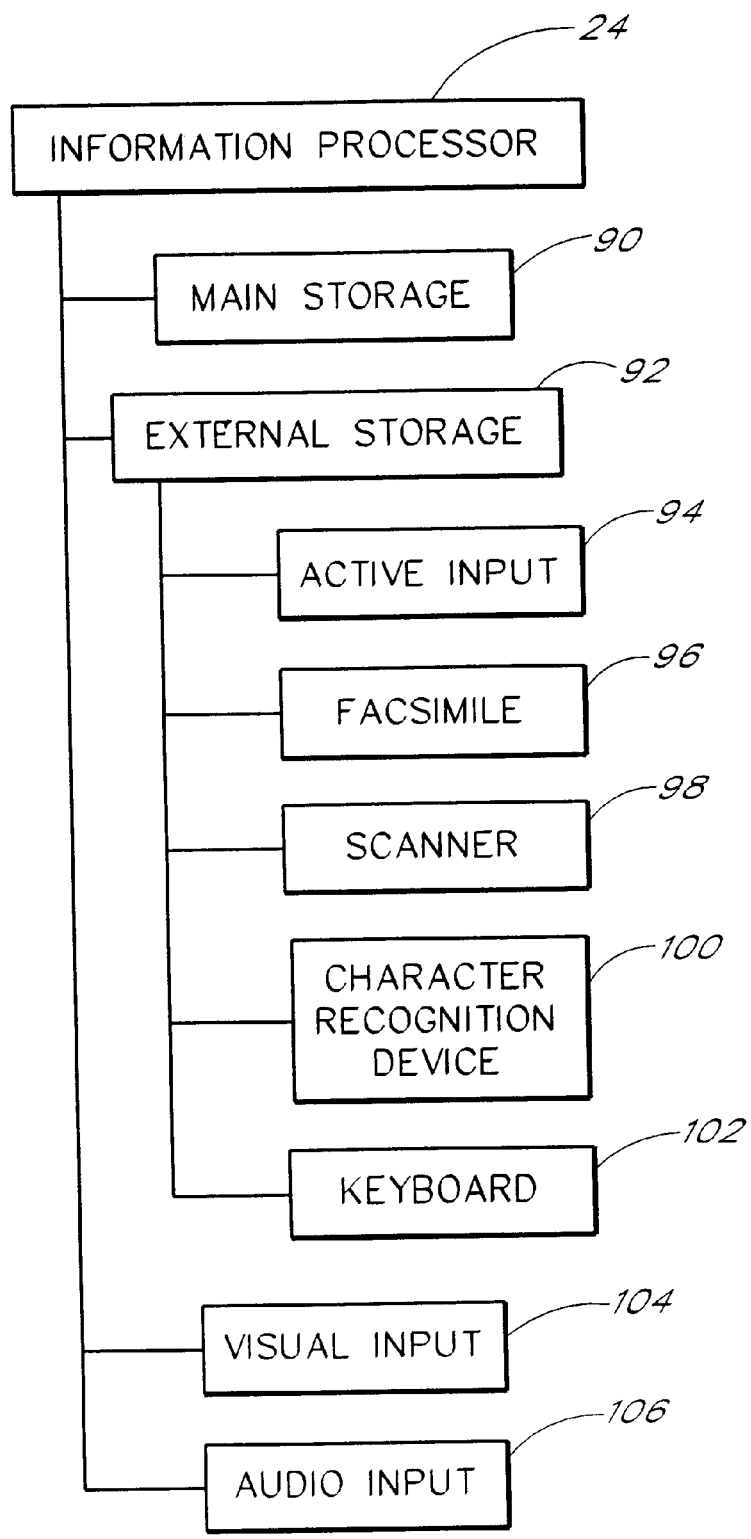
FIG. 6 is a diagram showing various information sources.

The selection of one or more of the subject matter areas 82 by selection area 84 sends a signal to the information processor 24 which uses the signal to compile responsive information for presentation to the reader or readers 26. The information processor 24 advantageously is in communication with a variety of information sources as shown in FIG. 6. These information sources include main storage 90, external storage 92, and active input sources 94. The active input 94 can include facsimile input 96, scanner input 98 and character recognition devices 100 as well as keyboard 102 for customized input of data. These information sources provide a variety of readability levels and information for use with the customized reading material 24.

Figure 7:
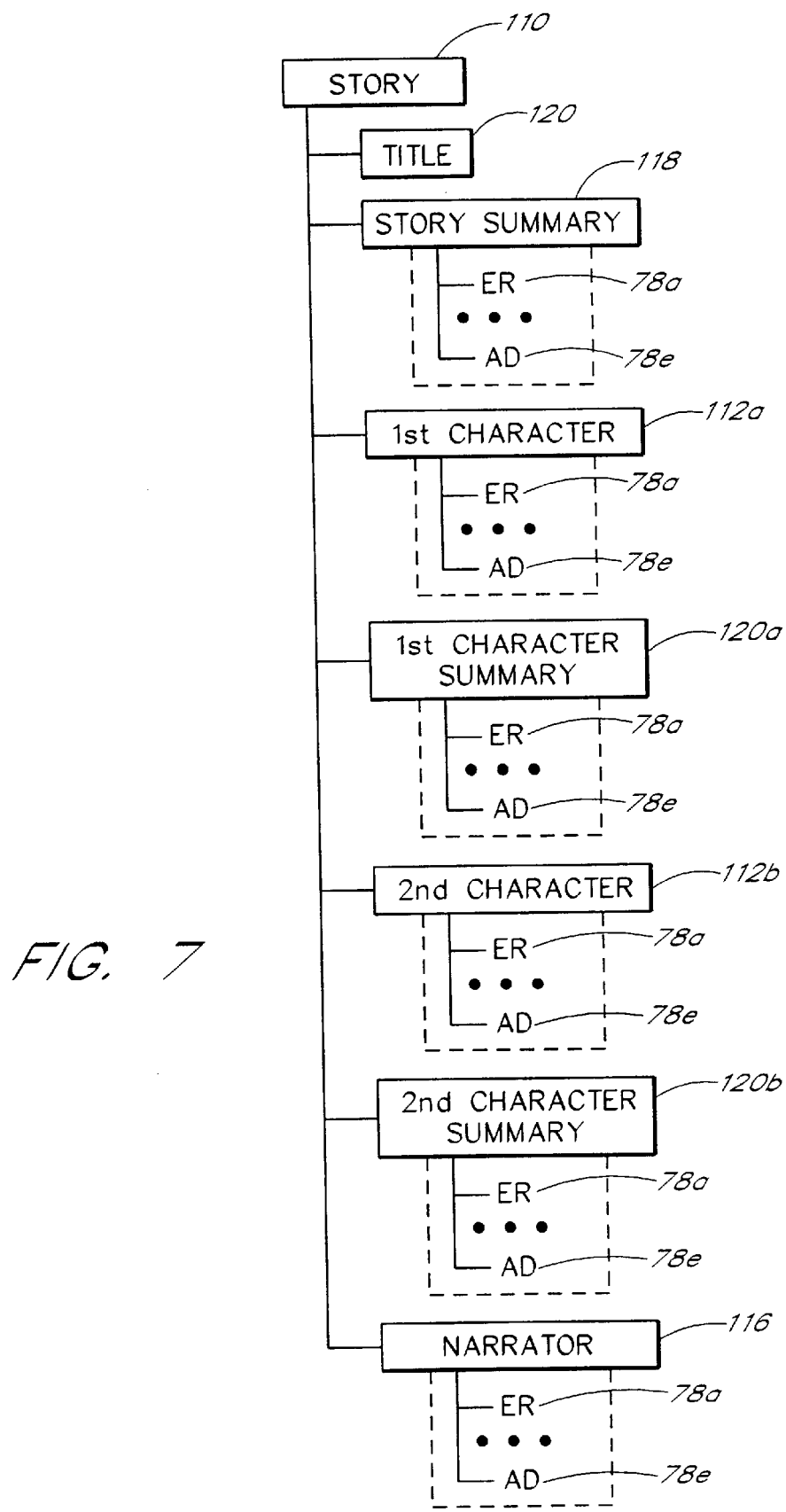
FIG. 7 is a diagram showing various data stored in, or accessible by, an information processor.

Referring to FIG. 7, preferably, each of the subject matter areas 82 stored has at least one story 110, and preferably a plurality of stories 110a, 110b, etc. Each story 110 has a number of characters 112a, 112b, etc., with the number of characters varying with the particular story.

Figure 8:
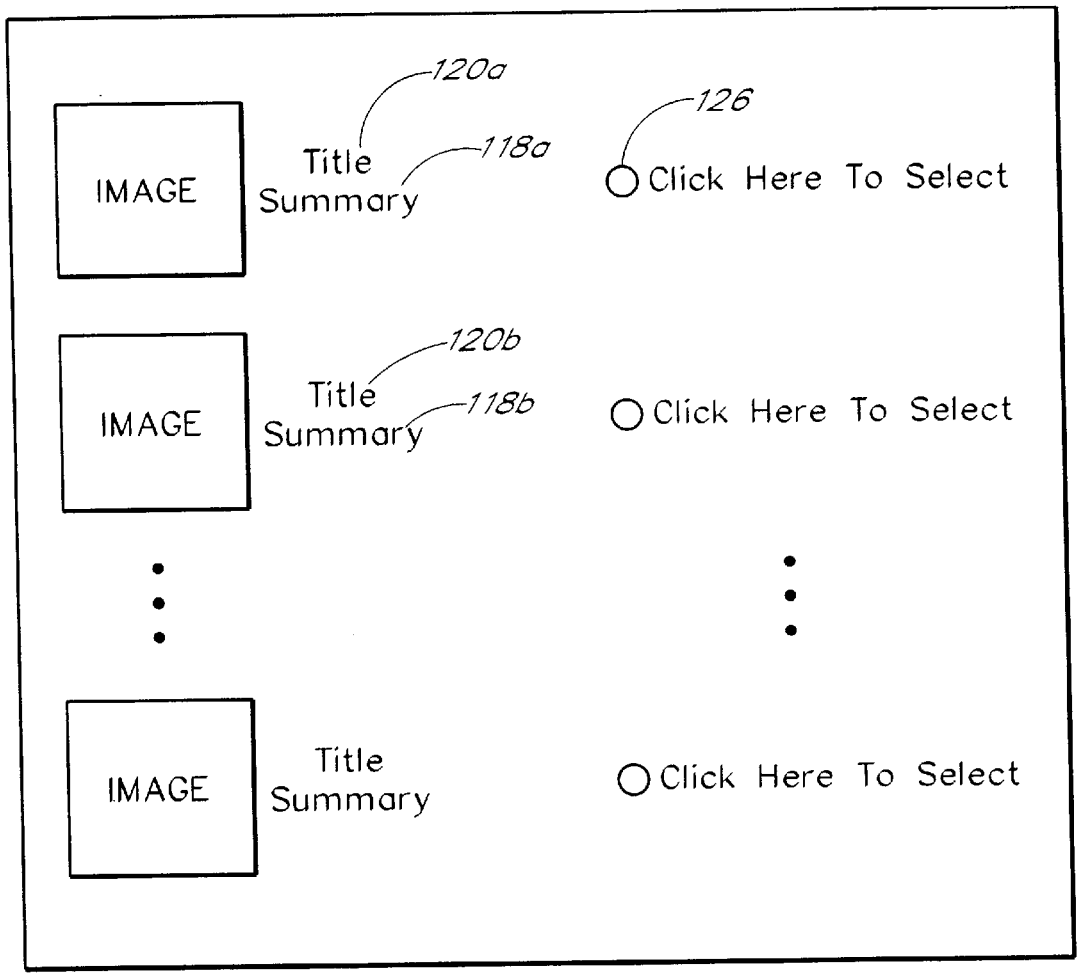
FIG. 8 is an illustration of a display screen showing various story summaries.

Referring to FIG. 8, for the stories 110 stored within a specific subject matter category 82, the information processor 24 preferably displays a list of titles of the stories meeting the desired criteria entered by the readers in Step 28, or the information processor 24 displays a summary or synopsis 118 of the responsive story 110. Stories may also be categorized by the maturity of the subject matter.

Further and more advantageously, the information processor 24 has access to and displays both a summary or synopsis 118 and the title 120 of each of the stories 110a, 110b, etc. Optionally, each summary or synopsis is written in a variety of readability levels so the reader 26 can read and understand the synopsis more easily. If summaries written in various readability levels are provided, a selection mechanism should be provided to allow the readers to designate the appropriate readability level of the summary to be displayed by the information processor 24. Preferably, the readability level for the story synopsis or summary is at a higher readability level, on the assumption that an adult will be working with a child or other reader 26 to select the story 110. Preferably, the list and summaries of stories also contain visual images associated with each story 110. These visual images are preferably similar to a picture of a typical book cover.

The display of FIG. 8 preferably has an active area cooperating with a selection mechanism by which the readers 26 can select a desired story 110 to be produced. Here, a selection box 126 is provided to communicate the desired selection to the information processor 24. If no stories 110 are found that meet the specified criteria entered by the readers in Step 5, suitable controls can be provided to allow the readers to return to the prior menu of FIG. 5 to select a different category.

Figure 9:
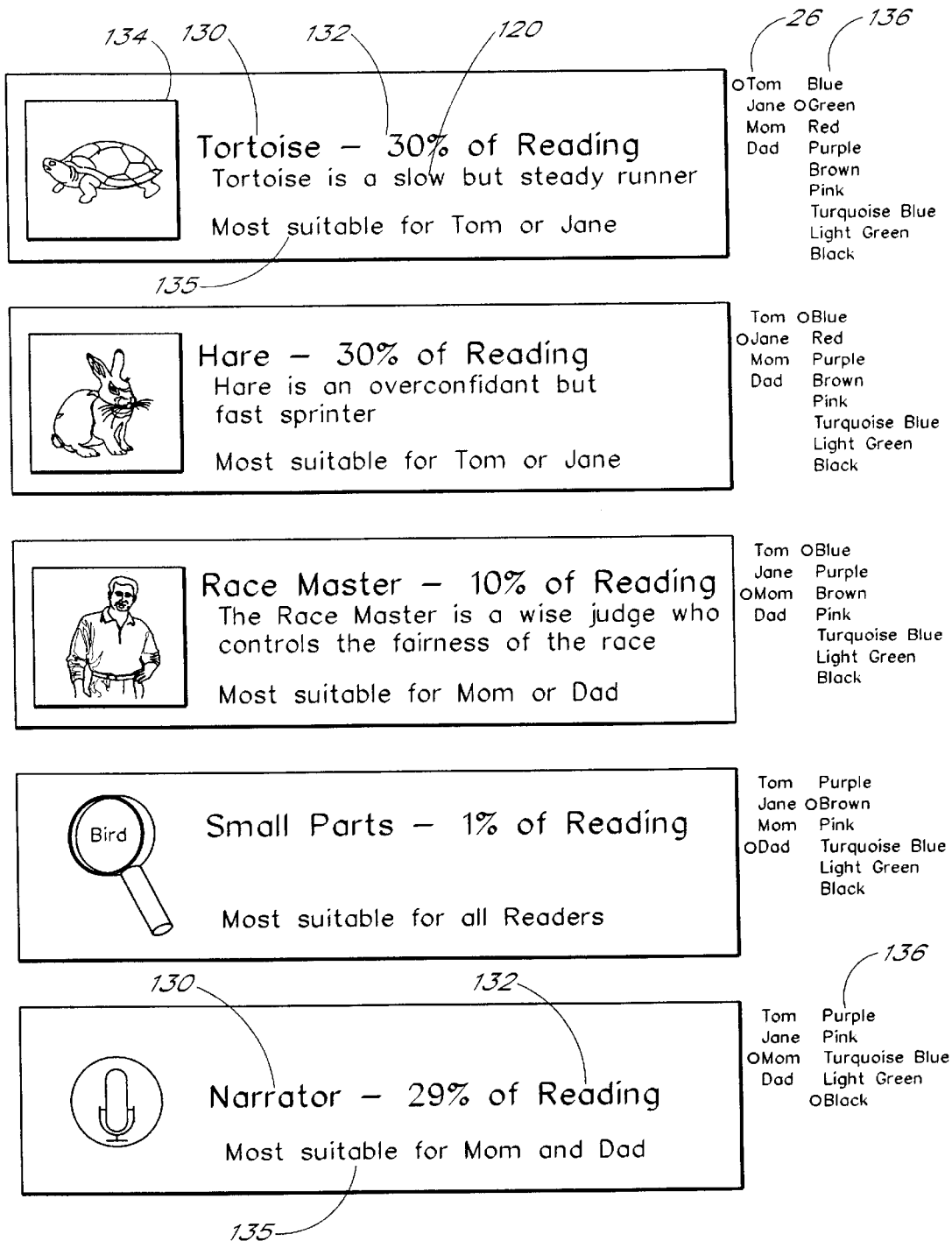
FIG. 9 is an illustration of a display screen showing various character summaries and indicia options.

Next and additionally, the information processor 24 has access to a summary or synopsis of each character 112a, 112b, etc. in each story (FIG. 9). The information for each character 112 that is presented preferably includes one or more of the name 130 of the character 112, a short summary or synopsis 120 of the character's part in the story including a description of the character's "persona" as intended by the author of the story, an indicator 132 of the relative portion of the total text of the entire story 110 which the reader will read for that character, and an image 134 associated with the character preferably showing a likeness of the character. An indicator 135 of which of the readers would be best suited to read the character's part, based upon previously entered information (FIG. 3) regarding the reader 26 may also be provided, although the reader may select any character 112.

Optionally, each character's synopsis is written in a variety of readability levels so the reader 26 can read and understand the synopsis more easily. If summaries written at various readability levels are provided, a selection mechanism is preferably provided to allow the reader to designate the appropriate readability level to be displayed for the character synopsis by the information processor 24. Preferably, the readability level for the character synopsis is at a higher readability level, on the assumption that an adult will be working with a child or other reader 26 to select the story 110.

Within each story 110 in the resulting reading material, each character 112 has a certain proportion of the story associated with the character. The portion of the story associated with each character 112 is allocated to words 114 that represent the dialogue of the character. The portion of the text to be read preferably comprises the words 114 representing the dialogue of each character, with little narration.

Also in the resulting reading material produced, incidental narration intermixed with a character's dialogue are preferably omitted and not printed or displayed, or if printed or displayed may be ignored by the reader who is reading the character's part and ignored by the narrator so as to not interrupt the reader. Thus, such portions of the text as "he said" or "she said" are preferably eliminated during editing when the dialogue of each character is rewritten to various reading levels. Further, descriptive narration which describes a tone of voice or an action that accompanies a character's dialogue, referred to herein as "cues" are preferably added during the revision of the words to meet various reading levels. Thus, a textual statement following a sentence of dialogue such as "the Hare said with a laugh" may be replaced with a cue. Advantageously, the cue is in parentheticals and set off by an appropriate font or indicia, such as italics, and would appear before the text to be read as: (while laughing). Thus, various means are provided for imparting the tone of voice, voice inflection, demeanor, or character actions to accompany portions of the dialogue text of each character 112.

The dialogue 114 for each character 112 is written in at least one, and advantageously plural predetermined readability levels, and more preferably in the various readability levels 76a, 76b . . . 76d, etc. associated with the criteria shown and discussed relative to FIG. 4. Each of these various readability level versions of the sentences and words 114 are preferably stored in main storage 90 or external storage 92, or available by active input as discussed relative to FIG. 6. Similarly, and alternatively, the words for various characters 112 can be edited and written for various maturity levels, in order to avoid having a younger child read themes designed for older children or teens or to avoid verbiage that may be less suitable for a child at a lower reading level. Thus, the reading material is written, constructed, re-constructed, or formatted in a manner that aids each reader in reading the material with confidence and without difficulty by providing text for the same dialogue 114 and narrative, but pre-written at a plurality of readability levels 76a, 76b . . . 76d, etc. so that each reader can be provided text that matches the reader's ability. Advantageously, teachers experienced in teaching readers at designated reading levels can be used to generate and/or edit the text for each character 112 to a plurality of appropriate reading level(s).

For the purposes of automating the tasks of constructing, reconstructing or formatting reading material to be presented with the dialogue text 114 for each character 112 in a plurality of indicias 136, as well as in a plurality of readability levels, it is believed desirable to have an information processor 24 program to make preliminary identifications of the character 112 dialogue 114 by searching the text of a document, such as a story, for quotation marks, and then associating and assigning the dialogue 114 within the quotations to the character 112 whose name follows the quotation. If no name follows the quoted dialogue 114, the name preceding the dialogue 114 is used. If "he said" or "she said" follows or precedes the quoted dialogue 114, the name of the last used character 112 is associated with the text.

Manual proofing will be needed with this method of identifying and assigning the various character 112 dialogues 114 because sometimes the identity of the character 112 speaking the dialogue 114 will not be accurately determined by the software and manual review and editing will correct any errors in the identity of which character 112 is assigned the dialogue 114. Any errors can be corrected by the person checking the dialogue 114. For text that is written specifically for use in the method and presentation of this invention, the text can be originally written and entered in into a computer text document with the appropriate placement of character 112 name associating the dialogue 114 along with appropriate or desirable narration and cues as described herein to avoid the need for manual proofing and correction.

Further, as the dialogue text 114 for a particular character 112 is identified and assigned to that character 112 by the information processor, the dialogue text 114 can then be electronically converted to a specific indicia 136 by the information processor, or the dialogue 114 can be converted at a later date by the information processor 24 to be presented in an indicia 136 selected by a particular reader. The use of the computer to produce or to help produce reading materials with dialogue 114 for each character 112 presented in an indicia 136 unique to each character 112 is believed to be useful by itself, and the resulting written material is likewise useful for predetermined groups of students or readers or for use with predetermined combinations of readability levels 76a, 76b . . . 76d, etc.

As a further enhancement to the above described "dialogue identification and conversion software", advantageously, during the processing of the text by the information processor, and as further needed during a manual review, a unique identifier can be associated, assigned and placed before, after or within the dialogue text 114 for each character 112 and stored in the information processor. This identifier allows a software program for information processor 24 to detect the identifier and associate the dialogue 114 for each character 112 properly for further conversions of text to a specific indicia 136 based on a pre-determined indicia 136 to be applied or an indicia 136 selected by a specific reader(s). This allows the document to be reconstructed and reformatted unlimitedly in the future for other predetermined or selected criteria or for other specific readers without the need for any further manual proofing. The identifier can be of any type detectable by the software, such as a unique name or symbol associated with the dialogue 114, narration or text for each character 112. The identifier could be corrected, added or deleted using the information processor, as needed. The result of these revisions is to end up with the dialogue 114 for each character 112 being identified and preferably tagged with identifiers readable by information processor 24 so that any dialogue segment or version of a dialogue segment may be retrieved and processed to have a specific and customized indicia 136 applied to it.

In certain embodiments of the invention, unnecessary text such as "the Tortoise said", "he said" or "she said," which is typically included in sentences that contain dialogue text 114 for most stories, are removed during a manual editing process in order for the story to read more smoothly during role-play reading. This text becomes unnecessary because all dialogue 114 in the story is presented in an indicia 136 which identifies that a character 112 is speaking. The reader speaking the dialogue 114 aloud during role-play reading does not need to say, nor does a narrator need to say "he said," or "the Tortoise said," as the dialogue 114 is or has obviously just been said, and by the reader assuming the persona of the Tortoise. Reading this unnecessary text aloud can be disruptive to role-play reading.

Sometimes this unnecessary text includes descriptive text as to voice inflection, character 112 demeanor or action associated with the dialogue 114 such as, "the Tortoise said with a laugh." In this case, a cue such as (while laughing) would be manually added before the dialogue 114 to indicate to the reader how to appropriately speak the dialogue 114 (e.g., to speak the sentence with a laugh in his voice). In order to automate the task of removing this unnecessary text, it is further desirable to have the information processor 24 software alter the text of the story. In the simplest revisions, the software deletes everything in the sentence but the dialogue 114. In more advanced revisions, the software replaces everything in the sentence, but the dialogue 114, with a "cue.".

In a more advanced embodiment of the above described "dialogue identification and conversion software," a feature is added that allows a plurality of versions of dialogue text 114 (these versions each having been edited to a different readability level, preferably readability levels 76a, 76b . . . 76d, etc.) to be entered and stored in the information processor 24 and associated with each piece of dialogue 114. A second identifier associated and assigned to each reading level version of the dialogue 114 can be added and stored with each version of dialogue 114 to make identification and retrieval by the information processor, easier in the same manner previously described. Once stored, the information processor 24 can reconstruct the story by retrieving and using any one particular version of the dialogue text 114 for a plurality of characters 112 to match a predetermined readability level or to match a desired readability level selected by a reader or plurality of readers. Each version of dialogue text 114 selected and used in the reconstructed story is then further converted into a predetermined indicia 136 or an indicia 136 selected by a specific reader(s) for presentation in the resulting reading material.

The cues associated with the dialogue 114 for each character 112 are also preferably rewritten at various readability levels 76a, 76b . . . 76d, etc. corresponding to the reading level of the associated dialogue 114, and stored along with the appropriate versions of dialogue 114 for later retrieval and use by the information processor using the identifier of the associated text. Further, as the dialogue 114 for each character 112 is revised to various readability levels 76a, 76b . . . 76d, etc. for storage in the information processor, the number of words for each readability level is preferably determined and stored in the information processor. By using appropriate data manipulation the relative portion (e.g., percentage of dialogue 114 of the total story) of each character's 112 dialogue 114 in a particular story can be determined, and if desired displayed for potential readers to see.

There is thus provided an automated means and method for identifying the dialogue 114 associated with each character 112 in a story, applying an indicia 136 to that dialogue 114, and entering and storing rewritten versions of that dialogue 114 to generate character 112 dialogues 114 written at a plurality of reading levels 76a, 76b . . . 76d, etc., with those dialogues 114 being stored in a information processor 24 so a character 112's dialogue 114 at an appropriate reading level can be retrieved and combined with dialogue 114 of other characters 112, as desired. Cues associated with each character 112's dialogue 114 are also identified, rewritten and stored for later retrieval and use by the information processor. These means and methods can be carried out in various orders and combinations.

Each story also contains narrative text 116 which describes the actions, surroundings and situation in which the characters 112 are placed in the story. The narrator's text is preferably defined as all text not in quotes, with quotes being used only to designate that a character 112 in the story is speaking. The narrator's text preferably remains black. The narrative text 116 is usually written at a higher readability level that is typically best suited for older children or adult readers as the narrative text typically provides the most information about the story and usually includes subtle nuances that give an overall flavor of the story and setting.

However, the narrative alternatively and advantageously, could be written in a plurality of predetermined readability levels, and more preferably in the various readability levels 76a, 76b, etc., associated with the criteria shown and discussed relative to FIG. 4. The various versions written at different reading levels are advantageously stored in the information processor 24 and preferably associated with a information processor 24 detectable identifier for later retrieval, recombination with the dialogue 114 of characters 112, application of indicia, and use. Further, the display preferably shows an indicator 132 reflecting the portion of the total text assigned to the narrator in the entire book.

Further, the display preferably shows an indicator 132 reflecting the portion of the total text assigned to the narrator in the entire book. The narration can make up a large percentage of most books, and for a typical child's book may comprise as much as 50% of the text. So that all readers may have the opportunity to read a somewhat equal share of the reading material, readers can take turns (usually by chapter) in reading the narration or one reader can be designated as the narrator. Preferably, a selection designated as "Take Turn Narrating" is provided during the information input stage so that readers may choose to Take Turns or to designate a specific reader as the narrator. Preferably, but not necessarily, a selection could be included to have the narrative automatically divided by chapter proportionately with each reader 26 designated to read the narration for a particular chapter so that the narration is apportioned about equally among all readers or among only the intermediate to advanced level readers. Each of the various pre-written readability level versions of the narrative 116 are preferably stored in main storage 90 or external storage 92, or available by active input as discussed relative to FIG. 6.

If the story 110 contains several incidental or small parts or characters, they may be omitted or designated as in FIG. 9 as "small parts" instead of being named. The display preferably shows an indicator 132 reflecting the portion of the total text assigned to all the "small parts" in the entire book. The text associated with these incidental characters can be read by whichever reader volunteers, or it can be selected by or pre-assigned to a reader or number of readers 26 as reflected in FIG. 9.

The number of characters 112 will vary with each story. The amount of words 114 associated with each character will vary with each story, as will the amount of narration 116. Information related to the amount of words 114 and preferably information related to the amount of narrative 116 is identified and stored and accessible by the processor 24, preferably stored in main storage 90 or external storage 92. This is preferably done for each character 112 of each story 110 and presented in an information summary in the resulting reading material produced.

Also during the information input stage as shown in FIG. 9, associated with each character 112, or the synopsis 120 of each character, is a selection list to assign a reader 26 to each character. The names provided in step 22 and FIG. 3 are used to generate a pull-down list of readers 26 to be assigned to each character. Preferably, the name of each reader 26 is provided in correlation with each potential character 112, as reflected in FIG. 9.

Advantageously there is one character for each reader 26. But the selection criteria used by the information processor 24 could allow more characters 112 than readers 26, or a request by the readers when inputting their selection criteria that the number of characters 112 may exceed the number of readers 26. This allows one reader 26 to read the parts for more than one character 112 and provides a wider selection of stories including stories with more complex plots as a result of the increased number of characters. As a reader selects a character, preferably, that character is then automatically removed by the information processor from the remaining selection lists so that another reader does not also select the same character. Similarly, when a reader select an indicia 136 associated with a character, that indicia is removed from the remaining selection lists so that another reader does not select the same indicia.

The dialogue for each character 112 selected is preferably provided, written, printed or displayed in the resulting reading material produced at an appropriate readability level for the reader 26 who selected that character. If a reader 26 selects more than one character 112, each of the character's dialogue that is selected is preferably provided at that appropriate readability level. But to challenge readers, it is possible to designate different readability levels for different characters 112, for the same reader 26. Thus, a child could read one character's part at an appropriate readability level, and another character's part (preferably a small part) at a slightly more advanced readability level. Thus, a method is provided for a reader who selects more than one character part to read to select a different readability level for each part.

As reflected by FIG. 9, each reader 26 preferably selects at least one character 112 in the story. The selection is achieved by selecting the name of the reader 26 from a pull-down list of all readers entered in Step 28 that appears by the desired character 112. Alternatively, the reader's name could be typed in by a keyboard and sent to the processor 24. There are a variety of ways to achieve the selection, and to associate a reader 26 with each character 112.

Once all reader information and reader selections have been entered by the readers, the process of creating the reading material can be achieved in various ways. It is achieved in the depicted embodiment by a computer link which sends the information provided in the input display to the information processor 24 for processing with the story and reading material information stored in the processor. Upon receipt of an appropriate command signal from the readers, the information processor 24 will prepare the customized reading material 20. The command signal is preferably not sent unless and until purchase information has been received and verified. By using the internet, the selection and acquisition of customized reading material 20 can be expedited. For example, the reader profiles, story, characters and associated indicia can be selected by an internet connection with the processor 24. The information processor 24 then allows the reader 26 to confirm the selection and order the reading material corresponding to the previously made selections. An exemplary order form is provided in FIG. 10 which may be provided over the internet, with various hyperlinked active areas. Exemplary data that may be provided includes an item number 140 corresponding to a unique identification number assigned to the story 110 selected. A description 142 of the story 110 selected can be included, with the description 142 preferably comprising the title of the story. The quantity 144 of the customized reading material 110 desired may be entered and will usually be the same quantity as the number of readers. A price 146 and subtotal is then provided for the reading material ordered 148. Data entry areas for other information may also be provided as shown in FIG. 10, including data entry areas for tax, shipping costs, total charges, purchaser's name, address, phone number, e-mail address, and payment information.

Upon receipt of an appropriate order form and verification of payment by the various means well known in the art and not described in detail herein, the command signal can be sent to the information processor 24 to prepare the customized reading material 20. The processor 24 will use the information on the readability level of each reader 26, will correlate that readability level with the character or characters 112 selected by each reader, and generate the customized reading material for the story selected with the version of text, for a specific character 112 that matches the readability level for each designated reader 26 making it easier for each reader to read their own part or parts. The version of text selected by the information processor 24 is selected from a plurality of pre-written sentences and words that have been stored in the information processor 24, or are accessible by the information processor 24 from a variety of input sources, such as ;main storage 90 external storage 92, or active input (FIG. 6).

Further, the indicia 136 for each reader 26 is correlated to the corresponding text to be read, and the indicia is applied to that text. Thus, using the above example, the text to be read by Tom for the Tortoise character would appear in green throughout the reading material 20. The text for the other readers would appear in different colors, or be designated by different indicia 136 making it easier for each reader to track their own reading parts.

Moreover, the size of the text for various characters 112 can be varied, and is preferably automatically varied by the information processor 24. For example, if the reader 26 is young or very old, the text of the reading material 20 is preferably in a larger font size so the young reader can follow the text easier, and so the older reader with presumably poorer vision can also follow the text more easily. Further, the type of text can include Braille if an appropriate printer is used to produce the reading material 20, so that visually impaired persons can benefit from the customized reading material.

Figure 11:
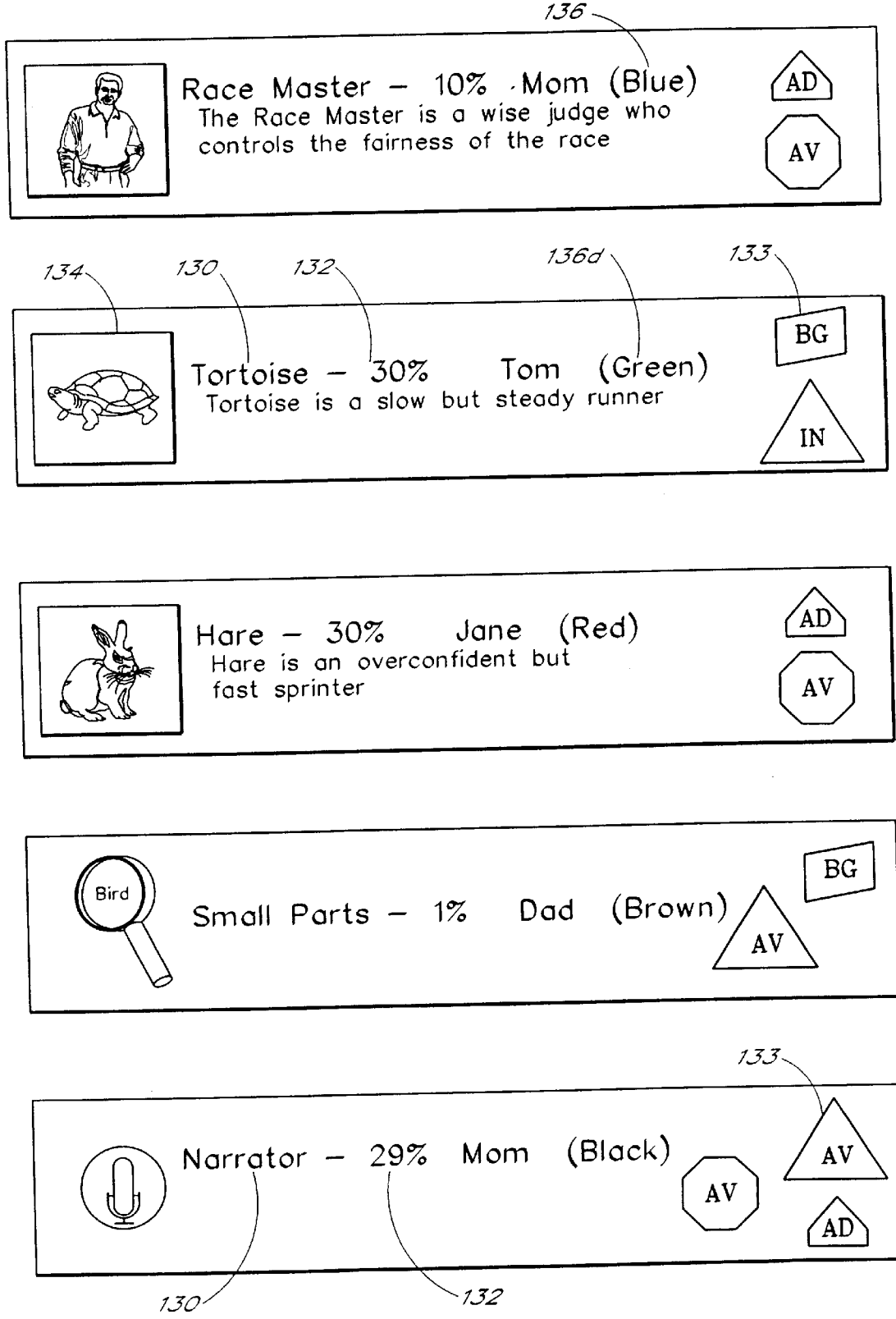
FIG. 11 is an illustration from exemplary reading material showing a character summary, associated information, and the assigned reader.
Figure 12A:
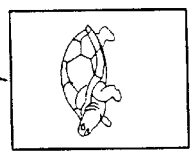
Figure 12A:
Figure 12A:
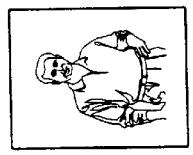
Figure 12A:
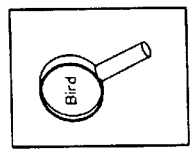
Figure 12A:
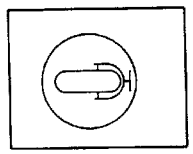
Figure 12B:
Figure 12B:
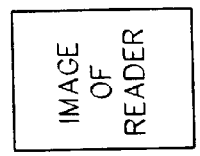
Figure 12B:
Figure 12B:
Figure 12B:

Referring to FIG. 11, it is preferred, but not required, that the customized reading material produced in its final form include a confirmation or summary page to the readers by providing the character name 130 and the name of the readers 26 selected and assigned to read each part, a copy of the short synopsis 120 of the character's part in the story 110 as provided in the input when the book was ordered by the readers, an indicator 132 of the relative portion of the text of the story 110 which the reader will read for that character, an image 134 associated with the character, preferably showing a likeness of the character, and an indicia 133 representative of the difficulty of reading of that particular character's part in the story.

Referring to FIG. 12, on each page of the reading material 20 there is preferably a legend 137 that lists and correlates each character 112 with the corresponding reader 26 and is shown in or with the corresponding color or indicia 136 that is used to associate the text with the reader and the character. This helps all the readers keep track of which character is to be read by which reader on a page by page basis throughout the story.

Figure 13:
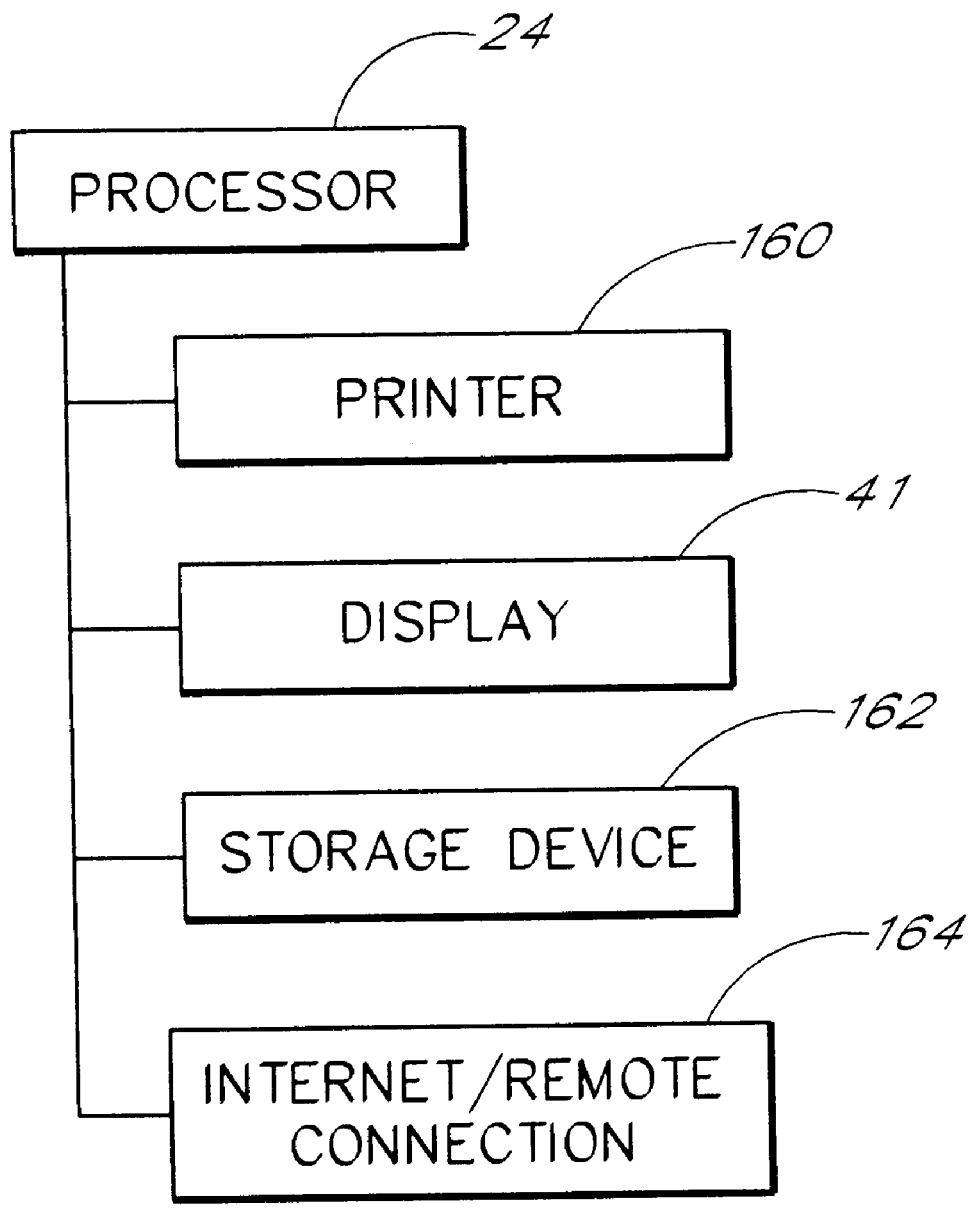
FIG. 13 is a diagram showing various ways of presenting customized reading material.

Referring to FIG. 13, the customized reading material 20 prepared by the information processor 24 is preferably sent to a printer 160 which prints the reading material onto paper in color, when color is used, whereupon the printed material is bound and an appropriate number of copies of the reading material, one for each reader, is sent to the readers 26. Advantageously the reading materials 20 can be printed and delivered by home based business.

Alternatively, the processor could send the information to a computer terminal associated with one of the readers 26, for printing by the reader. This data transmission could be by electronic data transfer, by optical signals, by internet, or other means now known or developed in the future. Further, the customized reading material 20 could be stored on various means, including electronic or magnetic data storage such as tapes or discs, or optical storage such as CD's, which are then sent to the reader.

When color is used as the indicia when presenting the text and because color is being used, pictures that typically are shown in black and white in many books can then be printed in color in the resulting material at little additional cost.

It is possible to add further features to the reading material 20. For example, the name of a character 112 in the story could be changed to match the name of the reader 26 who is reading the part of that character. Further, referring to FIG. 6, visual images could be added through visual input 104 or through other means. The visual images could include scanned or transmitted images of one or more of the readers 26, with the images or portions thereof associated with the text of reading material 20. Similarly, audio signals such as sounds, noises or speech could be input through the audio input 106, tape recorders, midi devices, etc.

The audio images could include audible signals corresponding to voice recordings of one or more of the readers 26, with the sounds, or portions thereof, associated with the text of reading material 20. Thus, for example, the sound made by a reader 26 named Tom could be heard at various locations throughout the reading material 20. These sounds and visual images could be stored on electronic or magnetic media or on the CD's along with the customized reading material 20, so that when a page of reading material is projected on to the computer screen or other display screen 41, the sound is heard.

The various information storage devices 90, 92 (FIG. 6) could also store information on each reader or group of readers to make it easier to create or order future customized reading materials 20. Thus, a customized reading profile for each reader could be created and stored for a variety of uses relative to creating materials 20, in particular for avoiding the need for users to re-enter information each time they order reading material, or to automatically advance or adjust the reading level for readers.

Moreover, the processor 24 could display the reading material 20 on a visible display, such as a computer screen 41 or other device in communication with the computer screen or processor 24, such as Web TV, that is in communication with appropriate storage media onto which the reading material 20 is stored. The story would be presented and displayed either one sentence at a time or one paragraph at a time and enlarged so that all readers could see the text from a predetermined distance in order to read each of their parts aloud just as with the printed materials. Each new sentence or paragraph of text would be displayed from the click of a mouse, the pressing of the enter key or from the recognition of a pre-determined spoken word or words through use of appropriate voice-recognition software and associated equipment. Preferably, but not necessarily, text displayed in the associated colors or indicia would be shown on the display just as in print. The presentation of text on the display could be accompanied by the reader's name that is assigned to read the text with the name appearing shortly before or at the same time as the text to be read. The presentation of text on the display could also follow or be accompanied by a separate and distinctive sound that is correlated and associated with each reader. This would serve as a prompt to be recognized by each reader to know who is to read the text immediately displayed following the presentation of the name or distinct sound. The above mentioned method of presenting the customized reading materials 20 via a visible display would eliminate the need for multiple of copies of the reading material, one for each reader.

In a further variation of the present invention, a "basic" book or reading material is created or re-constructed with one or all of the color, indicia or readability associations being made for readers of a generalized group rather than being generated and customized for a specific group of readers. For example, in its simplest embodiment, all the characters in the story would be printed or displayed in a different color, indicia, or combination thereof. Each reader in a group would simply choose a character and associate themselves with that character and color or indicia. In this simplest embodiment, each character's dialogue would not be written at specific and varying readability levels.

In the more advanced embodiment, readability levels would be incorporated. For example, in a re-creation of the Jungle Book, the character of Mowgli could be written throughout the reading material at a Beginning readability level, the part of Baloo could be written at an Intermediate level, the part of Bagheera could be written at an Advanced level, the narration written at an Adult level, and so on. The objective of doing this would be to have at least one character in the book written for each readability level to cover all potential or standardized readability levels that may be desired by all the potential readers and groups of readers who may purchase the book.

Further, within this "basic" format, the text for all characters that have been pre-written for the same readability levels could be displayed in the format previously described wherein all the Beginning level parts would be of the same color with supplemental single and double underlines or supplemental shades of the character's base color. Each reader could simply select a character or characters in the book that has been pre-written and pre-designated at a readability level that matches their own. In this manner, a Beginning level reader could select all the red parts, an Intermediate level reader could select all the blue parts, etc. This format allows a publisher to distribute one version of the reading material 20 and require buyers to select materials 20 that contain characters written at the readability levels that match or closely match the buyer's desired readability levels.

Further, within this "basic" format, reading materials 20 could be structured and written for certain "Readability Level Spans". Because the content of some reading materials 20 may only be appropriate or ideal for certain ages, the materials 20 could eliminate characters written in some readability levels and could thus only include a "span of readability levels". For example, reading material 20 could be labeled or designated for Ages 8–14 and only include text written at Intermediate, Advanced and Adult levels. For those reading materials 20 with content designed for younger readers, the "Readability Level Span" may not include the Intermediate or Advanced levels as typically; readers of those ages may be bored with the simple content of a book like "Gold locks and the Three Bears". For all reading material produced in the "basic" format, an appropriate number of copies of the reading material 20 for the number of readers 26, would have to be purchased or acquired.

In a still further embodiment, the reading material 20 can have one part written at a first reading level, such as the easiest Early reading level, and have a second part written at one level higher. A third part is written at an advanced or adult reading level and the narration is written at an adult level. A parent or advanced reader can then read all the parts except the easiest level at first, leaving this level for the child. Then, as the child progresses in reading ability, the child can attempt to read the second part written at the next higher level allowing the child an opportunity to progress their reading skills. This provides a "step-up" reading ability level structure that encourages children to read slightly more advanced text as they progress and further develop their reading ability. The re-reading of text familiarizes the child with the story and all the text and when combined with the availability of text at a slightly more advanced reading level encourages the child to advance in reading capability. There is thus advantageously provided the ability to produce customized reading material 20 in which one reader 26 can have more than one reading level associated with dialogue text and cues read by that reader 26. Thus, the dialogue text and cues associated with two or more characters 112 are written at different reading levels even though the characters 112 are assigned to a single reader 26.

The above description is given in the context of creating customized reading materials for people of various readability levels. But the invention is not limited to reading only English. For example, this invention could be used with different languages so that the text associated with one or more characters appears in a language different from the language used for other characters. For example, English and Spanish, or English and Chinese, or English and several other languages. Similarly, the level of sophistication of the non-English language could be varied. To implement a second language, appropriate selection mechanisms would have to be added to allow the reader 26 to select which language would be used for a character's text, and the appropriate level of that language for a specific reader 26. The audio information added to the reading material 20 could include the correct pronunciation of selected words or phrases. There is thus advantageously provided a way to enhance language learning capabilities. Further, the present invention and the resulting reading materials could be produced in any language for use by readers around the world.

The reading materials 20 prepared according to the above description preferably have the text for each character 112 presented in the same distinguishing indicia 136 and the same reading level, throughout the entire reading material. But variations are possible, especially if the reading material 20 includes a series of stories or articles presented together. Thus, the indicia 136 and reading level are preferably the same throughout one definable segment of the reading material 20, such as throughout an entire story, or an entire article. It is less preferably, but still possible, to have the indicia 136 and reading level for each character or a plurality of characters 112 to be the same throughout a substantial portion of each discrete portion of the reading material 20.

By substantial portion is meant something more than three-fourths of the discrete portion of the reading material. Further, it may be desirable to have reading material 20 that has text presented in indicia 136 associated with the text of each character to be read, but that does not have the text written in different reading levels. This would be desirable, for example, if a group of readers were at substantially the same reading level but the readers wanted text displayed in the indicia 136 to help distinguish the dialogue associated with each character just as described previously for the main embodiment of the present invention.

Finally, the above invention describes the dialogue for a character as being presented in a specific indicia that is unique for each character's dialogue. But other indicia could be used to distinguish the character dialogue, such as different letter styles or fonts or underlinings. Fonts or underlining can be varied, for example dotted, dashed, dot-dash, double dotted & dashed, thick, wavy, bolded, italicized, superscript, sub-script, shadowed, outlined, embossed, engraved, or capitalization. Color highlights can also be applied to character dialogue. Other indicia can be used. Preferably the indicia extends throughout each entire segment of dialogue, or a substantial portion of each segment of dialogue. But if the indicia used makes it difficult to read, then the indicia may be used for only the initial portions of each segment of dialogue, for example the first several words.

The above description of the present invention is given by way of example, and not limitation. Given the above disclosure, one skilled in the art could devise variations that are within the scope and spirit of the invention. Further, the various features of this invention can be used alone, or in varying combinations with each other and are not intended to be limited to the specific combination described herein. Thus, the invention is not to be limited by the illustrated embodiments but is to be defined by the following claims when read in the broadest reasonable manner to preserve the validity of the

What is claimed is:

1. A presentation of textual material having text corresponding to the dialogue of a plurality of characters and narrative, wherein the text for the dialogue of a first character is presented in a first indicia throughout substantially all the presentation, and wherein the text for the dialogue of a second character is presented in a second indicia throughout substantially all the presentation, the first and second indicia being different and the first indicia being unique to the dialogue of the first character.

2. A presentation as in claim 1, wherein the narration is presented in a third indicia throughout substantially all the presentation.

3. A presentation as in claim 1, wherein the first and second indicia comprise different colors.

4. A presentation as in claim 1, wherein the indicia comprises one of a font size or font style.

5. A presentation as in claim 1, wherein the first and second indicia are selected by a first and second reader before the text is presented.

6. A presentation as in claim 1, wherein the text associated with at least two of the characters is written at predetermined reading levels that differ by at least one grade in reading level and at least one of which differs from the reading level of the text as originally written.

7. A presentation as in claim 1, wherein the textual material is presented on paper.

8. A presentation as in claim 1, wherein the textual material is presented on an electronic display controlled by a computer.

9. A presentation as in claim 1, wherein the indicia is selected to enhance the ease of reading of the text for a person reading the text for a character.

10. A presentation as in claim 1, wherein the textual material is presented on pages which include a legend correlating the identity of a selected reader of text on the page with a character and with indicia corresponding to the character.

11. A presentation as in claim 1, wherein the textual material is presented on a page containing symbols representative of a reading level associated with at least one of the indicia and with characters appearing on the page.

12. A presentation as in claim 1, wherein the text for at least one character is written in language different from the text of another character.

13. A presentation as in claim 1, wherein the text associated with at least two of the characters is written at a reading level selected for one or more specific persons.

14. A presentation as in claim 1, further comprising cues adjacent a plurality of the dialogue to provide at least one of voice inflection, character demeanor and character action.

15. A presentation as in claim 1, wherein the textual material corresponding to a character is written in a plurality of different reading levels and selected by a specific reader from among that plurality of different reading levels.

16. A method of presenting reading material containing text corresponding to the dialogue of a plurality of characters, comprising the steps of:
    writing text corresponding to a first character in a first reading level and presenting that text in a first indicia for the entire text corresponding to the first character, the first indicia being unique to the text corresponding to the first character; and
    writing text corresponding to a second character in a second reading level and presenting that text in a second indicia for at least a substantial portion of the text corresponding to the second character.

17. A method as defined in claim 16, wherein the reading material contains narrative that is written at a predetermined reading level and presented in a third indicia.

18. A method as defined in claim 16, wherein the first and second indicia are different colors.

19. A method as defined in claim 16, wherein the reading level of the dialogues for a plurality of character dialogues are selected, before the reading material is presented, to correspond with the reading ability of specific persons who will read the text for each character.

20. A method as defined in claim 16, wherein the writing steps further comprise writing the text at a plurality of substantially different reading levels and wherein the presented text is selected from among those plurality of texts written at substantially different reading levels.

21. A method as defined in claim 16, wherein the reading material has a number of characters with dialogue and each character is assigned to a specific reader, with the presentation of text for each character being selected and presented according to the reading level of a specific reader assigned to each character.

22. A method as defined in claim 16, further comprising the steps of presenting a legend correlating the identity of the reader with the character and with any indicia assigned to the text of the character.

23. A method as defined in claim 16, comprising the further step of presenting the reading material on a page, and placing a legend on the page which identifies the first character and the first indicia with a name of a specific reader.

24. A method as defined in claim 19, comprising the further step of presenting the reading material on a page and placing indicia on at least one page that identifies the reading level associated with the text presented on the at least one page.

25. A method as defined in claim 19, comprising the further step of presenting the reading material on an electronic display controlled by a computer.

26. A method as defined in claim 25, comprising the further step of presenting the reading material in connection with audible sounds.

27. The method as defined in claim 16, further comprising the step of placing cues adjacent a plurality of the dialogue to instruct a reader on at least one of voice inflection, character demeanor and character action.

28. Reading material produced according to the method of claim 16.

29. Reading material produced according to the method of claim 18.

30. A presentation of a story having at least two characters with dialogue for each character that is to be read by at least one reader assigned to each character, wherein the dialogue for a plurality of characters is written at a reading level selected to correspond to the particular reader assigned to each of the plurality of characters, and presented in an indicia that is unique to each character and extending throughout a substantial portion of the dialogue associated with the plurality of characters.

31. The presentation of a story as defined in claim 30, wherein the dialogue of at least one character is presented in a larger font than text for other characters in order to make it easier to read the dialogue of that character.

32. The presentation of a story as defined in claim 30, wherein the dialogue assigned to at least one character is presented in a different font to distinguish the dialogue from that of other characters.

33. The presentation of a story as defined in claim 32, wherein the dialogue assigned to at least one character is presented in a different language than the language of another character.

34. The presentation of a story as defined in claim 31, wherein the indicia comprises a different color to distinguish the dialogue of one character from that of other characters.

35. The presentation of a story as defined in claim 30, wherein the dialogue assigned to at least one character is presented in a different color to distinguish the dialogue from that of other characters.

36. The presentation of a story as defined in claim 35, wherein the dialogue is presented on a page along with a legend that correlates the color, reader and character.

37. The presentation of a story as defined in claim 30 further including cues adjacent a plurality of the dialogue to provide at least one of voice inflection, character demeanor and character action.

38. A presentation as in claim 30 wherein the dialogue for a plurality of characters is selected from among a plurality of dialogues written at substantially different reading levels, with the reading level being selected for presentation according to the reading ability of a particular reader who is to read the dialogue.

39. An apparatus for preparing reading material having a plurality of characters with dialogue to be read by a plurality of readers, comprising:

means for inputting information relating to reading levels of a plurality of readers to an information processor;

means for selecting text for a first character appropriate for the reading level of a first reader assigned to the first character;

means for selecting text for a second character appropriate for the reading level of a second reader assigned to the second character;

means for presenting the selected text in a unique indicia for reading by the assigned readers for a substantial portion of the dialogue of the first and second characters.

40. The apparatus of claim 39, wherein the information processor has access to the same dialogue written in a plurality of substantially different reading levels and from which the text for the first and second characters is selected.

41. The apparatus of claim 40, wherein the means for selecting text for the first and second characters further comprises means for selecting text for specific persons.

42. The apparatus of claim 39, further comprising means for applying indicia to the text for at least one of the characters to distinguish the text from the text assigned to other characters.

43. The apparatus of claim 39, wherein the indicia is color.

44. The apparatus of claim 39, wherein the reading material is provided on a plurality of pages, and further comprising means for providing a legend on a plurality of the pages correlating the character, reader and indicia.

45. The presentation of claim 1, wherein the first and second indicia extend throughout the entire presentation.

46. The presentation of claim 16, wherein the text is presented in the first indicia throughout the entire portion of the text corresponding to the first character, and the text is presented in the second indicia throughout the entire portion of the text corresponding to the second character.

47. The presentation of claim 30, wherein the indicia that is unique to each character extends throughout the entire dialogue associated for each of said characters.

48. The apparatus of claim 39, wherein said means for presenting selected text in a unique indicia presents said text throughout the entire portion of the dialogue of the first and second characters.

49. A presentation of textual material having text corresponding to the dialogue of a plurality of characters and narrative, wherein the text for the dialogue of a first character is presented in a first indicia throughout substantially all the presentation, and wherein the text for the dialogue of a second character is presented in a second indicia throughout substantially all the presentation, the first and second indicia being different, wherein the textual material corresponding to a character is written in a plurality of different reading levels and selected by a specific reader from among that plurality of different reading levels before the presentation.

* * * * *